US012646978B2

(12) United States Patent
Shimura

(10) Patent No.: US 12,646,978 B2
(45) Date of Patent: Jun. 2, 2026

(54) POWER TRANSMITTING APPARATUS, POWER RECEIVING APPARATUS, METHOD, AND STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 18/421,451

(22) Filed: Jan. 24, 2024

(65) Prior Publication Data

US 2024/0195231 A1 Jun. 13, 2024

Related U.S. Application Data

(63) Continuation of application No. PCT/JP2022/026358, filed on Jun. 30, 2022.

(30) Foreign Application Priority Data

Jul. 28, 2021 (JP) ................................. 2021-123270

(51) Int. Cl.
  *H02J 50/80* (2016.01)
  *H02J 50/10* (2016.01)
(52) U.S. Cl.
  CPC .............. *H02J 50/80* (2016.02); *H02J 50/10* (2016.02)
(58) Field of Classification Search
  CPC ................................... H02J 50/80; H02J 50/10
  See application file for complete search history.

(56) References Cited

U.S. PATENT DOCUMENTS

| | | | | |
|---|---|---|---|---|
| 7,548,758 B2 * | 6/2009 | Periyalwar | ............ | H04L 67/104 |
| | | | | 370/324 |
| 8,559,389 B2 * | 10/2013 | Makabe | ............ | H04W 36/0088 |
| | | | | 455/433 |
| 9,847,667 B2 * | 12/2017 | Chu | ......................... | H02J 50/10 |
| 9,847,678 B2 * | 12/2017 | Garcia Briz | .......... | B60L 53/126 |
| 9,953,174 B2 * | 4/2018 | Niessen | ................ | G06F 21/604 |
| 9,987,935 B2 * | 6/2018 | Inoue | .................... | B60L 53/126 |
| 10,218,229 B2 * | 2/2019 | Alperin | ................... | H02J 50/10 |
| 10,637,301 B2 * | 4/2020 | Garbus | ................... | H02J 50/80 |
| 10,770,921 B2 * | 9/2020 | Moussaoui | ............. | H02J 50/12 |
| 10,787,085 B2 * | 9/2020 | Ichikawa | .............. | B60L 53/122 |

(Continued)

FOREIGN PATENT DOCUMENTS

| | | | | | |
|---|---|---|---|---|---|
| EP | 2950417 A1 * | 12/2015 | ............... | G01V 3/10 |
| EP | 4239846 B1 * | 10/2025 | .......... | H02J 7/00036 |

(Continued)

OTHER PUBLICATIONS

Power reception Device (Year: 2022).*

*Primary Examiner* — Hai V Nguyen

(74) *Attorney, Agent, or Firm* — Canon U.S.A., Inc. IP Division

(57) ABSTRACT

A power receiving apparatus wirelessly receives power from a power transmitting apparatus, and performs communication with the power transmitting apparatus. The power receiving apparatus transmits, to the power transmitting apparatus, a packet for requesting to stop a power transmission and to restart a power transmission, at a first frequency. The power receiving apparatus performs communication at a second frequency after the packet is transmitted.

8 Claims, 11 Drawing Sheets

(56) References Cited

U.S. PATENT DOCUMENTS

| | | | | |
|---|---|---|---|---|
| 10,805,967 B1 * | 10/2020 | Liu | | H04B 1/713 |
| 10,840,747 B2 * | 11/2020 | Shichino | | H04W 76/14 |
| 10,951,270 B2 * | 3/2021 | Shichino | | G06K 19/07 |
| 11,056,924 B2 * | 7/2021 | Kwon | | H04B 5/79 |
| 11,086,042 B2 * | 8/2021 | Park | | G01V 3/10 |
| 11,190,060 B2 * | 11/2021 | Shichino | | H04W 76/14 |
| 11,220,191 B2 * | 1/2022 | Kinomura | | B60L 53/305 |
| 11,316,384 B2 * | 4/2022 | Park | | H02J 50/90 |
| 11,632,002 B2 * | 4/2023 | Kwon | | H02J 50/12 |
| | | | | 307/104 |
| 11,689,065 B2 * | 6/2023 | Hoover | | H02J 50/80 |
| | | | | 320/108 |
| 11,728,691 B2 * | 8/2023 | AbuKhalaf | | H04B 5/79 |
| | | | | 320/108 |
| 11,870,276 B2 * | 1/2024 | Yahagi | | H02J 50/40 |
| 11,936,209 B2 * | 3/2024 | Kwon | | H04B 5/26 |
| 11,937,315 B2 * | 3/2024 | Shichino | | H02J 50/80 |
| 12,088,122 B2 * | 9/2024 | Park | | H02J 50/60 |
| 12,095,289 B2 * | 9/2024 | Choi | | H02J 50/60 |
| 12,176,734 B2 * | 12/2024 | Tachiwa | | H04B 5/79 |
| 12,207,328 B2 * | 1/2025 | Shichino | | H04W 76/14 |
| 12,228,655 B1 * | 2/2025 | MacGougan | | G01S 19/20 |
| 12,294,229 B2 * | 5/2025 | AbuKhalaf | | H02J 50/80 |
| 12,512,703 B2 * | 12/2025 | Park | | H02J 50/60 |
| 12,519,346 B2 * | 1/2026 | Park | | H02J 50/60 |
| 2009/0144568 A1 * | 6/2009 | Fung | | G06F 1/324 |
| | | | | 713/300 |
| 2012/0094666 A1 * | 4/2012 | Awoniyi | | H04W 48/16 |
| | | | | 455/435.1 |
| 2014/0308986 A1 * | 10/2014 | Yang | | H04W 36/0088 |
| | | | | 455/552.1 |
| 2015/0091386 A1 * | 4/2015 | Nagamine | | H02J 7/70 |
| | | | | 307/104 |
| 2015/0214752 A1 * | 7/2015 | Gluzman | | H02J 50/12 |
| | | | | 307/104 |
| 2015/0244201 A1 * | 8/2015 | Chu | | H02J 50/10 |
| | | | | 320/108 |
| 2015/0244425 A1 * | 8/2015 | Nakase | | H04B 5/79 |
| | | | | 307/104 |
| 2015/0283909 A1 * | 10/2015 | Ichikawa | | B60L 53/122 |
| | | | | 307/10.1 |
| 2016/0006264 A1 * | 1/2016 | Alperin | | H04W 52/0216 |
| | | | | 307/104 |
| 2016/0075240 A1 * | 3/2016 | Inoue | | B60L 53/60 |
| | | | | 320/108 |
| 2016/0144726 A1 | 5/2016 | Yoshida et al. | | |
| 2016/0372976 A1 * | 12/2016 | Shimura | | H02J 50/402 |
| 2017/0085128 A1 * | 3/2017 | Garcia Briz | | B60L 53/62 |
| 2018/0233956 A1 * | 8/2018 | Moussaoui | | H02J 50/12 |
| 2018/0270050 A1 * | 9/2018 | Ohtani | | H04W 4/38 |
| 2019/0058360 A1 * | 2/2019 | Garbus | | H02J 50/80 |
| 2019/0199141 A1 * | 6/2019 | Nagamine | | H02J 7/70 |
| 2019/0310388 A1 * | 10/2019 | Park | | G01V 3/10 |
| 2019/0312468 A1 * | 10/2019 | Kwon | | H02J 50/12 |
| 2019/0312469 A1 * | 10/2019 | Shichino | | H02J 50/80 |
| 2019/0315245 A1 * | 10/2019 | Kinomura | | B60L 53/66 |
| 2019/0363758 A1 * | 11/2019 | Shichino | | G06K 19/07 |
| 2020/0092365 A1 * | 3/2020 | Periyalwar | | H04W 72/044 |
| 2020/0280932 A1 * | 9/2020 | Down | | H04W 52/283 |
| 2020/0366137 A1 * | 11/2020 | Park | | H02J 50/80 |
| 2021/0028654 A1 * | 1/2021 | Shichino | | H02J 50/10 |
| 2021/0036555 A1 * | 2/2021 | Park | | H02J 50/402 |
| 2021/0167638 A1 * | 6/2021 | Yahagi | | H02J 50/90 |
| 2021/0296938 A1 * | 9/2021 | Kwon | | H02J 50/60 |
| 2021/0305849 A1 * | 9/2021 | Shimura | | H02J 50/12 |
| 2022/0131422 A1 * | 4/2022 | Choi | | H02J 50/60 |
| 2022/0239161 A1 * | 7/2022 | Park | | H02J 50/402 |
| 2023/0126095 A1 * | 4/2023 | Park | | H02J 50/60 |
| | | | | 307/104 |
| 2023/0216354 A1 * | 7/2023 | Kwon | | H04B 5/26 |
| | | | | 307/104 |
| 2023/0275472 A1 * | 8/2023 | Shimura | | H02J 50/60 |
| | | | | 307/149 |
| 2023/0283120 A1 * | 9/2023 | Lee | | H02J 50/10 |
| | | | | 307/104 |
| 2023/0327500 A1 * | 10/2023 | Tachiwa | | H04B 5/79 |
| | | | | 307/104 |
| 2023/0344280 A1 * | 10/2023 | Choi | | H01F 38/14 |
| 2023/0420759 A1 * | 12/2023 | Chelakkat | | H01M 10/425 |
| 2024/0088726 A1 * | 3/2024 | Yahagi | | H02J 50/402 |
| 2024/0188154 A1 * | 6/2024 | Shichino | | H02J 50/80 |
| 2025/0098006 A1 * | 3/2025 | Shichino | | H02J 50/80 |
| 2025/0258300 A1 * | 8/2025 | MacGougan | | H01Q 5/335 |

FOREIGN PATENT DOCUMENTS

| | | | | |
|---|---|---|---|---|
| JP | 2013244825 A | 12/2013 | | |
| JP | 2014023402 A | 2/2014 | | |
| JP | 2015008580 A | 1/2015 | | |
| JP | 2015180177 A | 10/2015 | | |
| JP | 2019186814 A | 10/2019 | | |
| JP | 2019187070 A | 10/2019 | | |
| WO | WO-2022264800 A1 * | 12/2022 | | H02J 50/10 |
| WO | WO-2023281343 A1 * | 1/2023 | | H04L 9/3263 |
| WO | WO-2023008091 A1 * | 2/2023 | | H04B 5/26 |

* cited by examiner

102 POWER SUPPLY UNIT

103 POWER TRANSMITTING CIRCUIT UNIT

105

104 FIRST COMMUNICATION UNIT

CONTROL UNIT

MEMORY

SECOND COMMUNICATION UNIT 107    101    106

POWER TRANSMITTING APPARATUS (TX)

100

200

205

202 POWER RECEIVING CIRCUIT UNIT

206 CHARGING UNIT

207 BATTERY

203 FIRST COMMUNICATION UNIT

204 SECOND COMMUNICATION UNIT

CONTROL UNIT

208 MEMORY

201

POWER RECEIVING APPARATUS (RX)

FIG. 10

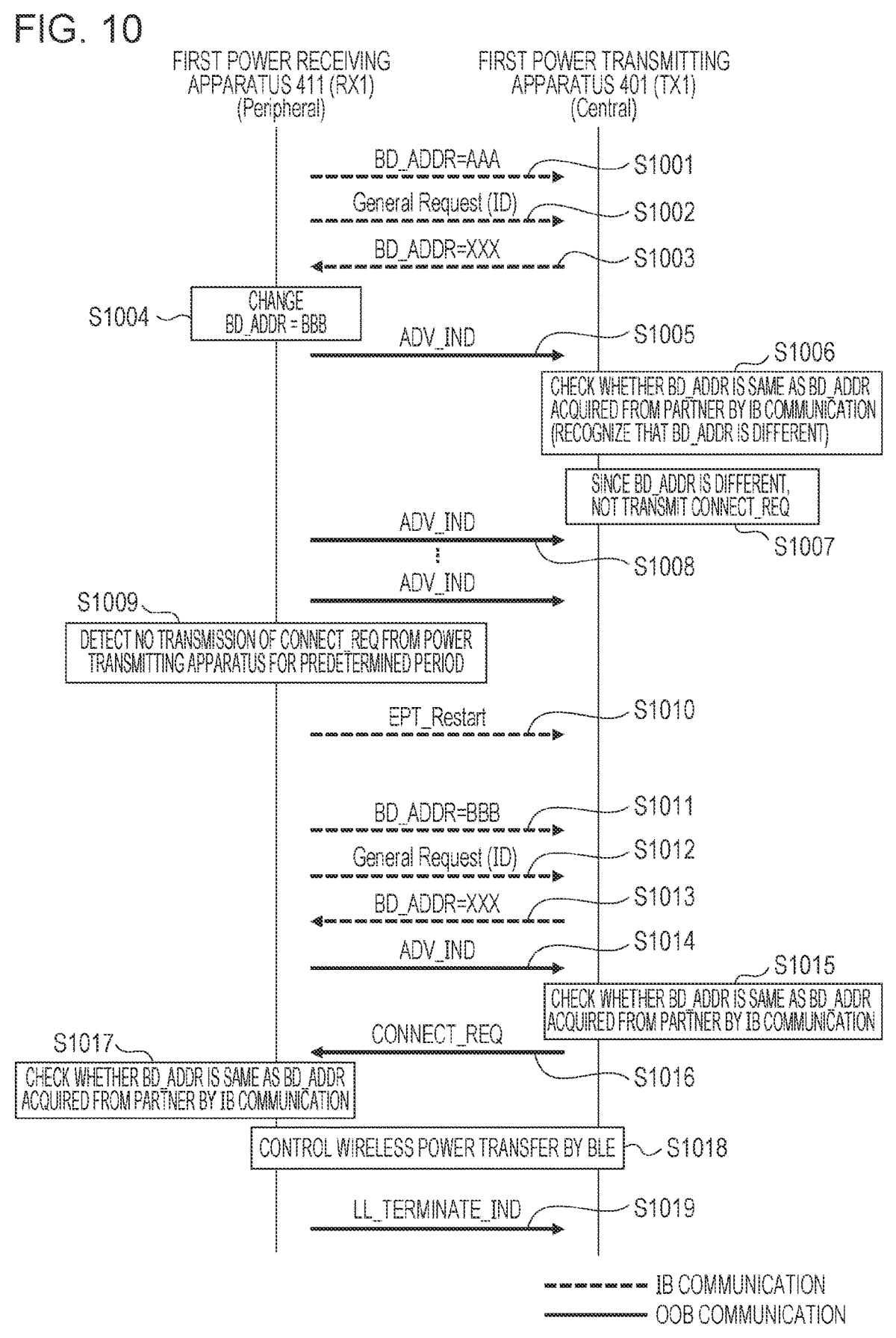

FIRST POWER RECEIVING
APPARATUS 411 (RX1)
(Peripheral)

FIRST POWER TRANSMITTING
APPARATUS 401 (TX1)
(Central)

BD_ADDR=AAA — S1001

General Request (ID) — S1002

BD_ADDR=XXX — S1003

S1004 — | CHANGE
BD_ADDR = BBB |

ADV_IND — S1005

S1006
| CHECK WHETHER BD_ADDR IS SAME AS BD_ADDR
ACQUIRED FROM PARTNER BY IB COMMUNICATION
(RECOGNIZE THAT BD_ADDR IS DIFFERENT) |

| SINCE BD_ADDR IS DIFFERENT,
NOT TRANSMIT CONNECT_REQ |

ADV_IND

S1007

ADV_IND — S1008

ADV_IND

S1009 —
| DETECT NO TRANSMISSION OF CONNECT_REQ FROM POWER
TRANSMITTING APPARATUS FOR PREDETERMINED PERIOD |

EPT_Restart — S1010

BD_ADDR=BBB — S1011

General Request (ID) — S1012

BD_ADDR=XXX — S1013

ADV_IND — S1014

S1015
| CHECK WHETHER BD_ADDR IS SAME AS BD_ADDR
ACQUIRED FROM PARTNER BY IB COMMUNICATION |

CONNECT_REQ

S1017 — — S1016
| CHECK WHETHER BD_ADDR IS SAME AS BD_ADDR
ACQUIRED FROM PARTNER BY IB COMMUNICATION |

| CONTROL WIRELESS POWER TRANSFER BY BLE | — S1018

LL_TERMINATE_IND — S1019

--- --- --- --- IB COMMUNICATION
———————— OOB COMMUNICATION

POWER TRANSMITTING APPARATUS, POWER RECEIVING APPARATUS, METHOD, AND STORAGE MEDIUM

CROSS-REFERENCE TO RELATED APPLICATIONS

This application is a Continuation of International Patent Application No. PCT/JP2022/026358, filed Jun. 30, 2022, which claims the benefit of Japanese Patent Application No. 2021-123270, filed Jul. 28, 2021, both of which are hereby incorporated by reference herein in their entireties.

TECHNICAL FIELD

The present disclosure relates to a wireless power transfer technique.

BACKGROUND ART

In recent years, techniques for wireless power transfer systems have been widely developed. PTL 1 discloses control of which of a first communication method and a second communication method using different frequencies is used for control communication for wireless power transfer. PTL 1 proposes that, in this control, identification information of an electronic device used in the second communication method is communicated by the first communication method. PTL 1 further proposes that identification information is included in a signal communicated by the second communication method, so that the communication can be performed by appropriately specifying the partner of the wireless power transfer.

CITATION LIST

Patent Literature

PTL 1 Japanese Patent Laid-Open No. 2019-187070

In an apparatus such as a smartphone, for example, identification information used for communication may be changed regularly or irregularly from the viewpoint of privacy protection. If the technique of PTL 1 is applied to such an apparatus, the identification information communicated by the first communication method may be different from the identification information communicated by the second communication method. Therefore, there is a possibility that control communication for wireless power transfer is not appropriately performed.

SUMMARY

The present disclosure has been made in view of the above problem, and an object of the present disclosure is to appropriately perform communication for wireless power transfer even if identification information of an apparatus, which is used for communication, is changed.

One aspect of the present disclosure for solving the above problem is as follows. That is, a power receiving apparatus includes: power receiving means for wirelessly receiving power from a power transmitting apparatus via a first antenna; first communication means for performing communication with the power transmitting apparatus via the first antenna; second communication means for performing communication via a second antenna different from the first antenna; control means for controlling the first communication means to transmit, to the power transmitting apparatus, identification information for identifying the power receiving apparatus, the identification information being used for communication performed by the second communication means; and changing means for regularly or irregularly changing the identification information for identifying the power receiving apparatus, the identification information being used for communication performed by the second communication means, in which, if, after the first communication means transmits the identification information, the identification information is changed before the second communication means establishes a connection with the power transmitting apparatus, the control means controls the first communication means to transmit the identification information changed by the changing means.

Other aspect of the present disclosure is as follows. That is, a power receiving apparatus wirelessly receiving power from a power transmitting apparatus, and performing communication with the power transmitting apparatus. The power receiving apparatus transmits, to the power transmitting apparatus, a packet for requesting to stop a power transmission and to restart a power transmission, at a first frequency. The power receiving apparatus performs communication at a second frequency after the packet is transmitted.

Further features of the present disclosure will become apparent from the following description of exemplary embodiments with reference to the attached drawings.

BRIEF DESCRIPTION OF DRAWINGS

FIG. 10 is a sequence diagram illustrating a process example for performing wireless power transfer in a fourth embodiment.

DESCRIPTION OF EMBODIMENTS

First Embodiment

Figures 1, 2:
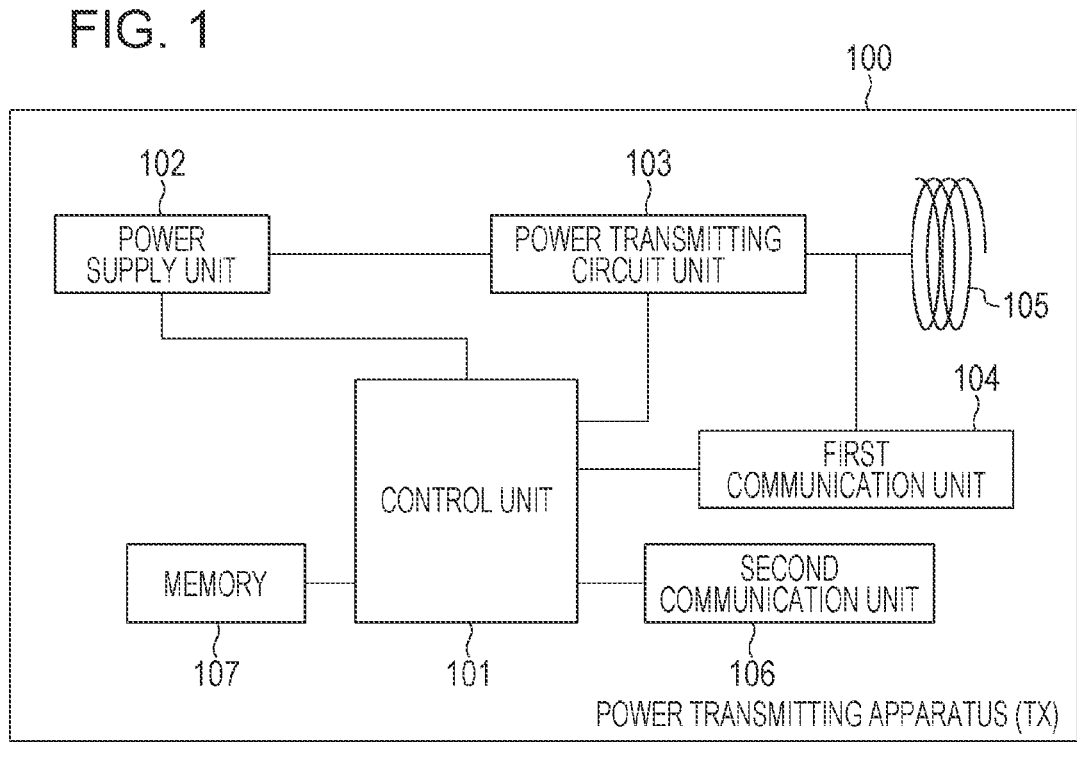
FIG. 1 is a diagram illustrating a configuration example of a power transmitting apparatus.
FIG. 2 is a diagram illustrating a configuration example of a power receiving apparatus.

Hereinafter, embodiments will be described in detail with reference to the accompanying drawings. Although a plurality of features are described in the embodiments, all of the plurality of features are not necessarily essential to the present disclosure, and the plurality of features may be freely combined. Moreover, in the accompanying drawings, the same or similar components are denoted by the same reference numerals.

Configuration of Wireless Power Transfer System

Figure 4:
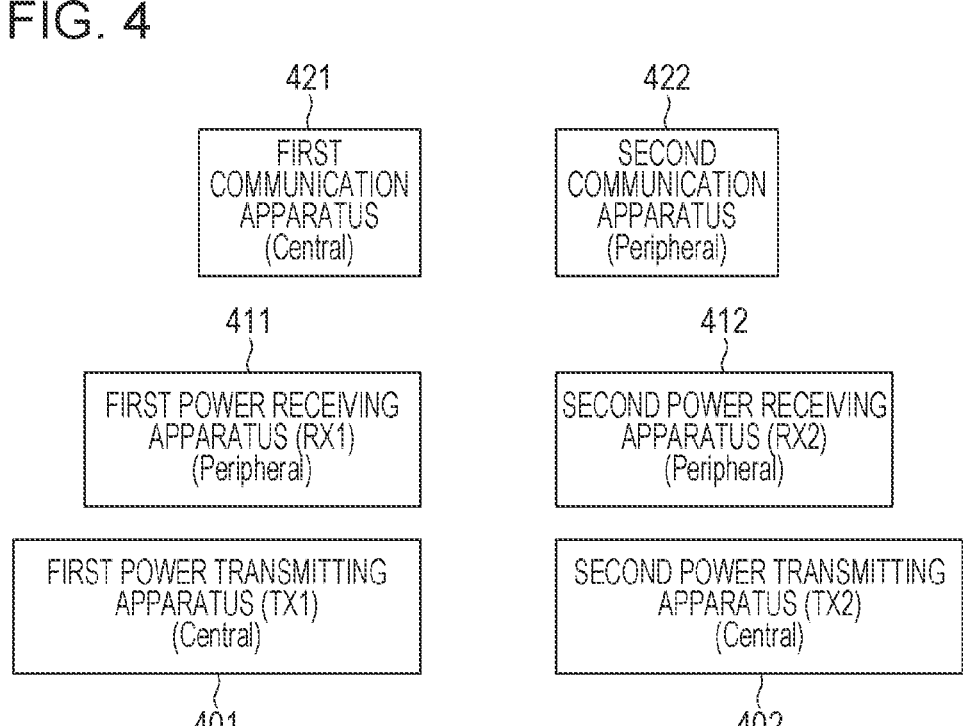
FIG. 4 is a diagram illustrating a configuration example of a wireless power transfer system.

FIG. 4 illustrates a wireless charging system according to this embodiment. The wireless charging system includes a power transmitting apparatus (a first power transmitting apparatus 401 and a second power transmitting apparatus 402) and a power receiving apparatus (a first power receiving apparatus 411 and a second power receiving apparatus 412). Hereinafter, the first power transmitting apparatus 401 and the first power receiving apparatus 411 may be referred to as "TX1" and "RX1", respectively, and similarly, the second power transmitting apparatus 402 and the second power receiving apparatus 412 may be referred to as "TX2" and "RX2", respectively.

The power receiving apparatus is an electronic device that receives power from the power transmitting apparatus and charges a built-in battery. The power transmitting apparatus is an electronic device that wirelessly transmits power to the power receiving apparatus placed on the power transmitting apparatus. Note that the power receiving apparatus and the power transmitting apparatus can have a function of executing an application other than wireless charging. An example of the power receiving apparatus is a smartphone, and an example of the power transmitting apparatus is an accessory device for charging the smartphone. The power receiving apparatus and the power transmitting apparatus may be a tablet, a storage device such as a hard disk device or a memory device, or an information processing apparatus such as a personal computer (PC). In addition, the power receiving apparatus and the power transmitting apparatus may be, for example, an imaging apparatus (a camera, a video camera, or the like), an automobile, a robot, a medical device, or a printer. The power receiving apparatus may also be an electric vehicle. The power transmitting apparatus may also be a charger installed in a console or the like in an automobile, or may be a charging apparatus that charges an electric vehicle.

Note that each of the power transmitting apparatus and the power receiving apparatus has a communication function based on Bluetooth (registered trademark) Low Energy (BLE). Specifically, the power transmitting apparatus and the power receiving apparatus perform communication, based on a standard that is the Bluetooth 4.0 or later. FIG. 4 illustrates, as an example, a case where other devices (a first communication apparatus 421 and a second communication apparatus 422) that have a communication function based on BLE but do not have a wireless power transfer function are present around this wireless charging system. Hereinafter, a communication unit (a unit including an antenna, a communication circuit, and the like) for BLE may be referred to as "BLE". Detailed configurations of the power transmitting apparatus and the power receiving apparatus will be described later with reference to FIGS. 1 and 2.

In this system, wireless power transfer using an electromagnetic induction method for wireless charging is performed based on a standard (WPC standard) formulated by Wireless Power Consortium (WPC), which is a non-contact charging standardization organization. That is, the power receiving apparatus and the power transmitting apparatus perform wireless power transfer for wireless charging based on the WPC standard between a power receiving antenna 205 of the power receiving apparatus and a power transmitting antenna 105 of the power transmitting apparatus. Note that the wireless power transfer method applied to this system is not limited to the method defined by the WPC standard, and may be another electromagnetic induction method, a magnetic field resonance method, an electric field resonance method, a microwave method, or a method using a laser or the like. In this embodiment, wireless power transfer is used for wireless charging. However, wireless power transfer may be used for purposes other than wireless charging.

In the WPC standard, the amount of power that is guaranteed to be output from the power receiving apparatus to a load (such as a charging circuit and a battery) is defined by a value called Guaranteed Power (hereinafter referred to as "GP"). The GP indicates a power value that is guaranteed to be output to the load (such as the charging circuit and the battery) of the power receiving apparatus even if the power transmission efficiency between the power receiving antenna 205 and the power transmitting antenna 105 decreases due to, for example, a change in the positional relationship between the power receiving apparatus and the power transmitting apparatus. For example, in a case where the GP is 5 watts, even if the positional relationship between the power receiving antenna 205 and the power transmitting antenna 105 changes and the power transmission efficiency decreases, the power transmitting apparatus transmits power by performing control so that 5 watts can be output to the load in the power receiving apparatus. In addition, the GP is determined by negotiation conducted between the power transmitting apparatus and the power receiving apparatus. Note that this embodiment is applicable to a configuration in which power, not limited to the GP, which is determined by negotiation conducted between the power transmitting apparatus and the power receiving apparatus, is transmitted and received.

In addition, during power transmission from the power transmitting apparatus to the power receiving apparatus, if a foreign object, which is not the power receiving apparatus, is present in the vicinity of the power transmitting apparatus, an electromagnetic wave for power transmission may affect the foreign object to increase the temperature of the foreign object or destroy the foreign object. Therefore, the WPC standard defines a method in which the power transmitting apparatus detects the presence of a foreign object on the power transmitting apparatus so as to prevent a temperature increase or destruction of the foreign object by stopping power transmission if the foreign object is present. Specifically, a Power Loss (power loss) method is defined for detecting a foreign object, based on a difference between power transmitted from the power transmitting apparatus and power received by the power receiving apparatus. A Q value measurement method is also defined for detecting a foreign object, based on a change in the quality factor (Q value) of the power transmitting antenna 105 (power transmitting antenna) in the power transmitting apparatus. Note that the foreign object detected by the power transmitting apparatus in this embodiment is not limited to an object present on the power transmitting apparatus. The power transmitting apparatus only needs to detect a foreign object located in the vicinity of the power transmitting apparatus, and may detect, for example, a foreign object located in a range in which the power transmitting apparatus can transmit power. Furthermore, the foreign object detection method is not limited to the above-described method, and may be a waveform attenuation method. The waveform attenuation method is a method in which power transmission is temporarily stopped or power to be transmitted is temporarily reduced, and foreign object detection is performed based on an attenuation state of a power transmission waveform (a voltage waveform or a current waveform) related to the power transmission at that time.

Figure 13:
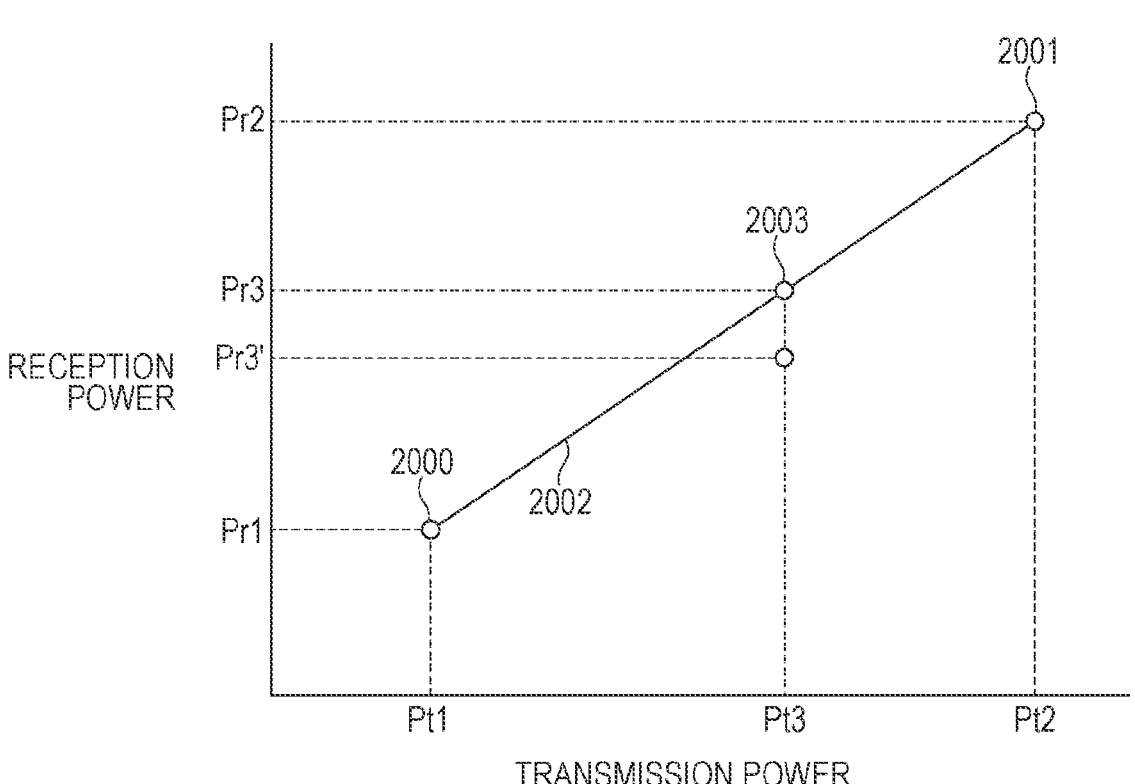
FIG. 13 is a diagram for explaining a method of setting a threshold in foreign object detection by a Power Loss method.

The foreign object detection based on the Power Loss method defined by the WPC standard will be described with reference to FIG. 13. The horizontal axis of FIG. 13 is transmission power of the power transmitting apparatus, and the vertical axis is reception power of the power receiving apparatus. The foreign object in the present disclosure is, for example, a clip, an IC card, or the like. The foreign object does not include an object which may unintentionally generate heat when exposed to wireless power transmitted from the power transmitting antenna, among objects in essential parts of the power receiving apparatus and a product in which the power receiving apparatus is incorporated or the power transmitting apparatus and the power transmitting apparatus are incorporated.

First, the power transmitting apparatus transmits power to the power receiving apparatus at a first transmission power value Pt1. The power receiving apparatus receives power at a first reception power value Pr1 (this state is referred to as a Light Load state (light load state)). Then, the power transmitting apparatus stores the first transmission power value Pt1. Here, the first transmission power value Pt1 or the first reception power value Pr1 is a predetermined minimum transmission power or reception power. At this time, the power receiving apparatus controls the load so that the power to be received is minimized. For example, the power receiving apparatus may disconnect the load from the power receiving antenna 205 so that the received power is not supplied to the load (such as the charging circuit and the battery). Subsequently, the power receiving apparatus reports the first reception power value Pr1 to the power transmitting apparatus. Upon receiving Pr1 from the power receiving apparatus, the power transmitting apparatus can calculate the power loss between the power transmitting apparatus and the power receiving apparatus as Pt1−Pr1 (=Ploss1), and create a calibration point 2000 indicating the correspondence between Pt1 and Pr1.

Subsequently, the power transmitting apparatus changes the transmission power value to a second transmission power value Pt2 and transmits power to the power receiving apparatus. The power receiving apparatus receives power at a second reception power value Pr2 (this state is referred to as a Connected Load state (load connected state)). Then, the power transmitting apparatus stores the second transmission power value Pt2. Here, the second transmission power value Pt2 or the second reception power value Pr2 is a predetermined maximum transmission power or reception power. At this time, the power receiving apparatus controls the load so that the power to be received is maximized. For example, the power receiving apparatus connects the power receiving antenna 205 to the load so that the received power is supplied to the load. Subsequently, the power receiving apparatus reports Pr2 to the power transmitting apparatus. Upon receiving Pr2 from the power receiving apparatus, the power transmitting apparatus can calculate the power loss between the power transmitting apparatus and the power receiving apparatus as Pt2−Pr2 (=Ploss2), and create a calibration point 2001 indicating the correspondence between Pt2 and Pr2.

Then, the power transmitting apparatus creates a straight line 2002 for linear interpolation between the calibration point 2000 and the calibration point 2001. The straight line 2002 indicates the relationship between the transmission power and the reception power in a state where no foreign object is present in the vicinity of the power transmitting apparatus and the power receiving apparatus. Based on the straight line 2002, the power transmitting apparatus can estimate the value of power received by the power receiving apparatus when power is transmitted at predetermined transmission power in a state where there is no foreign object. For example, if the power transmitting apparatus transmits power at a third transmission power value Pt3, a third reception power value to be received by the power receiving apparatus can be estimated to be Pr3 from a point 2003 corresponding to Pt3 on the straight line 2002.

As described above, the power loss between the power transmitting apparatus and the power receiving apparatus according to the load can be obtained based on a plurality of combinations of the transmission power value of the power transmitting apparatus and the reception power value of the power receiving apparatus measured while changing the load. In addition, it is possible to estimate the power loss between the power transmitting apparatus and the power receiving apparatus according to all loads by interpolation from the plurality of combinations. A process performed by the power transmitting apparatus and the power receiving apparatus in order for the power transmitting apparatus to acquire a combination of the transmission power value and the reception power value in this manner is referred to as a calibration process.

It is assumed that the power transmitting apparatus receives a reception power value Pr3' from the power receiving apparatus when the power transmitting apparatus actually transmits power to the power receiving apparatus at Pt3 after calibration. The power transmitting apparatus calculates a value Pr3−Pr3' (=Ploss_FO) obtained by subtracting the reception power value Pr3' actually received from the power receiving apparatus from the reception power value Pr3 in a state where no foreign object is present. This Ploss_FO can be considered as a power loss due to power consumed by a foreign object if the foreign object is present in the vicinity of the power transmitting apparatus and the power receiving apparatus. Therefore, if the power Ploss_FO that would have been consumed by the foreign object exceeds a predetermined threshold, it can be determined that the foreign object is present. Alternatively, the power transmitting apparatus obtains in advance a power loss Pt3−Pr3 (=Ploss3) between the power transmitting apparatus and the power receiving apparatus from the reception power value Pr3 in a state where no foreign object is present. Then, subsequently, a power loss Pt3−Pr3' (=Ploss3') between the power transmitting apparatus and the power receiving apparatus in a state where the foreign object is present is obtained from the reception power value Pr3' received from the power receiving apparatus in a state where the foreign object is present. Then, using Ploss3'−Ploss3 (=Ploss_FO), the power Ploss_FO that would have been consumed by the foreign object may be estimated.

As described above, the power Ploss_FO that would have been consumed by the foreign object may be calculated as Pr3−Pr3' (=Ploss_FO) or Ploss3'−Ploss3 (=Ploss_FO). In the following description, a method of obtaining Ploss3'−Ploss3 (=Ploss_FO) will be basically described, but the details of this embodiment can also be applied to a method of obtaining Pr3-Pr3' (=Ploss_FO). The foreign object detection based on the Power Loss method has been described above.

The foreign object detection by the Power Loss method is performed during power transfer (power transmission) (a Power Transfer phase to be described later), based on data obtained in a Calibration phase to be described later. In addition, the foreign object detection by the Q value measurement method is performed before power transfer (before transmission of a Digital Ping to be described later, in a Negotiation phase or a Renegotiation phase).

RX and TX according to this embodiment perform communication for controlling wireless power transfer based on the WPC standard. In the WPC standard, a plurality of phases are defined, including the Power Transfer phase in which power transfer is performed and one or more phases before actual power transfer, and necessary communication for wireless power transfer is performed in each phase. The phases before power transfer may include a Selection phase, a Ping phase, an Identification and Configuration phase, the Negotiation phase, and the Calibration phase. Hereinafter, the Identification and Configuration phase is referred to as I & C phase. Processes in the respective phases will be described below.

In the Selection phase, TX intermittently transmits an Analog Ping, and detects that an object is placed on the power transmitting apparatus (for example, that RX, a conductor piece, or the like is placed on a charging stand). TX detects at least one of the voltage value and the current value of the power transmitting antenna 105 at the time of transmission of the Analog Ping. If the voltage value is lower than a certain threshold, or if the current value exceeds a certain threshold, TX determines that an object is present and transitions to the Ping phase.

In the Ping phase, the power transmitting apparatus transmits a Digital Ping having a larger amount of power than the Analog Ping. The Digital Ping has sufficient power to activate a control unit of the power receiving apparatus placed on the power transmitting apparatus. That is, the Digital Ping is power transmitted from the power transmitting apparatus to activate the power receiving apparatus. The power receiving apparatus notifies the power transmitting apparatus of the voltage value of reception power. This notification is provided using a Signal Strength Packet defined by the WPC standard. In this way, by receiving a response from the power receiving apparatus that has received the Digital Ping, the power transmitting apparatus recognizes that the object detected in the Selection phase is the power receiving apparatus. Upon being notified of the voltage value of reception power, the power transmitting apparatus transitions to the I & C phase. Before transmitting the Digital Ping, the power transmitting apparatus measures the Q value (Q-Factor) of the power transmitting antenna 105. This measurement result is used to execute a foreign object detection process using the Q value measurement method.

In the I & C phase, the power transmitting apparatus identifies the power receiving apparatus, and acquires device configuration information (capability information) from the power receiving apparatus. The power receiving apparatus transmits an ID Packet and a Configuration Packet. The ID Packet includes identification information of the power receiving apparatus, and the Configuration Packet includes the device configuration information (capability information) of the power receiving apparatus. Upon receiving the ID Packet and the Configuration Packet, the power transmitting apparatus responds with an acknowledgement (ACK, positive response). Then, the I & C phase ends.

In the Negotiation phase, the value of GP is determined based on the value of GP requested by the power receiving apparatus, the power transmission capability of the power transmitting apparatus, and the like. In addition, the power transmitting apparatus performs the foreign object detection process using the Q value measurement method in response to a request from the power receiving apparatus. In addition, the WPC standard defines a method of performing the same process as that in the Negotiation phase again in response to a request from the power receiving apparatus after transition to the Power Transfer phase. A phase, transitioned from the Power Transfer phase, in which these processes are performed is referred to as the Renegotiation phase.

In the Calibration phase, Calibration is performed based on the WPC standard. In addition, the power receiving apparatus notifies the power transmitting apparatus of a predetermined reception power value (reception power value in the light load state/reception power value in the maximum load state), and the power transmitting apparatus performs adjustment for efficient power transmission. The reception power value of which the power transmitting apparatus is notified can be used for the foreign object detection process by the Power Loss method.

In the Power Transfer phase, control for starting and continuing power transmission, stopping power transmission due to an error or full charge, and the like is performed. For wireless power transfer, the power transmitting apparatus and the power receiving apparatus perform communication by superimposing a signal on an electromagnetic wave transmitted from the power transmitting antenna 105 or the power receiving antenna 205, using the power transmitting antenna 105 and the power receiving antenna 205 used when performing wireless power transfer based on the WPC standard. Note that the range in which communication based on the WPC standard is possible between the power transmitting apparatus and RX is substantially the same as the power transmittable range of the power transmitting apparatus.

Here, as illustrated in FIG. 4, the first power transmitting apparatus 401 (TX1) and the second power transmitting apparatus 402 (TX2) function as a BLE Central, and the first power receiving apparatus 411 (RX1) and the second power receiving apparatus 412 (RX2) function as a BLE Peripheral. In addition, the first communication apparatus 421 functions as a Central, and the second communication apparatus 422 functions as a Peripheral.

Note that the "Central" indicates a BLE control station, and the "Peripheral" indicates a BLE terminal station. The BLE Central performs communication with the BLE Peripheral, but does not perform communication with another Central. In addition, the BLE Peripheral performs communication with the BLE Central, but does not perform communication with another Peripheral. That is, in BLE, communication between Centrals or between Peripherals is not performed. In addition, the Central can be in a connected state (CONNECT_State of BLE) with a plurality of Peripherals, and can transmit and receive data to and from the plurality of Peripherals. On the other hand, the Peripheral can be in a connected state with only one Central, and does not communicate with a plurality of Centrals in parallel.

In FIG. 4, it is assumed that, when viewed from TX1, RX1 is located within the power transmission/reception range, whereas RX2 is not located within the power transmission/reception range. Therefore, TX1 performs wireless power transfer only to RX1, and does not perform power transfer to RX2.

In this case, in order for TX1 to perform control communication for wireless power transfer by out of band (Out-of-Band) communication using BLE, TX1 as the BLE (Central) needs to be in a connected state with RX1 as the BLE (Peripheral). As described above, since the BLE Central can be in a connected state with a plurality of Peripherals at the same time, TX1 as the BLE (Central) may be in a connected state with not only RX1 but also RX2 or the second communication apparatus 422 functioning as a Peripheral. Similarly, TX2 as the BLE (Central) may be in a connected state with RX1 or the second communication apparatus 422 as long as it is in a connected state with RX2 as the BLE (Peripheral). In the present disclosure, out of band (Out-of-Band) communication refers to communication using an antenna different from an antenna for power transmission/reception. Hereinafter, it may be referred to as "OOB communication". On the other hand, communication using the antenna for power transmission/reception is referred to as in band (In-Band) communication. Hereinafter, it may be referred to as "IB communication".

On the other hand, RX1 as the BLE (Peripheral) can be connected with only one Central. Therefore, in order to perform control communication for power transfer between TX1 and RX1 by BLE, RX1 as the BLE (Peripheral) needs to be in a connected state with only TX1 as the BLE (Central). This is because when RX1 as the BLE (Peripheral) is in a connected state with another BLE (Central), such as TX2 or the first communication apparatus 421, it becomes not possible for RX1 as the BLE (Peripheral) to perform control communication with TX1 as the BLE (Central). Similarly, in order to perform control communication for power transfer between TX2 and RX2 by BLE, RX2 as the BLE (Peripheral) needs to be in a connected state with only TX2 as the BLE (Central). Therefore, RX2 as the BLE (Peripheral) is not to be in a connected state with another BLE (Central), such as TX1 or the first communication apparatus 421.

As described above, control communication is to be performed between the power transmitting apparatus and the power receiving apparatus (such as TX1 and RX1) that execute power transmission and reception. However, if the communication range of OOB communication is wider than the communication range of IB communication, the power transmitting apparatus and the power receiving apparatus may establish a connection for OOB communication with a device that is not a power transmission/reception target. Such establishment of a connection for OOB communication with a device that is not a power transmission/reception target is referred to as a cross connection. For example, in FIG. 4, a state in which RX1 is BLE-connected with TX2 or the first communication apparatus 421 is the cross connection.

In FIG. 4, when TX1 uses BLE (OOB communication) as control communication, without confirmation that a BLE connection is established with RX1 within the power transmission/reception range, RX1 is not to transmit power for charging the battery of RX1, negotiate about power, or the like. This is because, if TX1 establishes a BLE connection with RX2 or the second communication apparatus 422 and performs control communication while setting RX1 as a power transmission target, the power transmission target (RX1) and a partner apparatus (RX2 or the second communication apparatus 422) of the control communication may be different. In this case, it is not possible for TX1 to perform appropriate control communication with RX1. Similarly, in a case of using control communication by BLE (OOB communication), without confirmation that a BLE connection is established with TX1 within the power transmission/reception range, RX1 is not to receive power for charging the battery from TX1, negotiate about power, or the like. This is because, if RX1 establishes a BLE connection with TX2 or the first communication apparatus 421 and performs control communication while receiving power that is transmitted from TX1, the transmission source (TX1) of power and a partner apparatus (TX2 or the first communication apparatus 421) of the control communication may be different. In this case, it is not possible for RX1 to perform appropriate control communication with TX1.

As described above, in the wireless power transfer system in FIG. 4, it is important for both the power transmitting apparatus and the power receiving apparatus to obtain confirmation that control communication by BLE with the partner apparatus within the power transmission/reception range is possible, prior to transmission/reception of power for charging the battery and negotiation of that power. Note that the "control communication" includes communication for exchanging information necessary for wireless power transfer, such as communication for exchanging information between the power transmitting apparatus and the power receiving apparatus necessary for performing foreign object detection, communication for device authentication in the above-described TX, and the like.

Therefore, in this embodiment, the power transmitting apparatus and the power receiving apparatus are configured to be capable of establishing a BLE connection with the partner apparatus of wireless power transfer. In order to implement this, a Bluetooth Device Address, which is a Public Address defined by the BLE standard and indicates individual identification information of a BLE communication function (a second communication unit 106 or 204 to be described later) of the apparatus, is used. Alternatively, individual identification information of a manufacturer of the power transmitting apparatus or the power receiving apparatus may be used. Hereinafter, the Bluetooth Device Address is referred to as "BD_ADDR".

The power receiving apparatus or the power transmitting apparatus may, for example, change the BD_ADDR regularly or irregularly from the viewpoint of privacy protection. In this embodiment, the power transmitting apparatus and the power receiving apparatus are configured to be capable of establishing a BLE connection with the partner apparatus of wireless power transfer even if the power receiving apparatus or the power transmitting apparatus changes the BD_ADDR. Note that the BD_ADDR may be changed by partly or entirely changing the BD_ADDR, or may be changed by switching a plurality of BD_ADDRs.

Note that BLE is an example, and any wireless communication method available for OOB communication in wireless power transfer can be used. In the following description, it is assumed that wireless power transfer to be executed is compliant with the WPC standard, and the WPC standard herein includes functions defined in version 1.2.3. Note that in this embodiment, the power transmitting apparatus and the power receiving apparatus are described as being compliant with the WPC standard, but without being limited to this, may be compliant with another wireless power transfer standard. Now, configuration examples of the power transmitting apparatus and the power receiving apparatus and an example of a flow of processes to be executed will be described below.

Configurations of Power Transmitting Apparatus and Power Receiving Apparatus

Configurations of the power transmitting apparatus and the power receiving apparatus in this embodiment will be described. Note that the configurations described below are merely examples, and some (in some cases, all) of the described configurations may be replaced with other configurations having other similar functions or may be omitted, and still other configurations may be added to the described configurations. Furthermore, one block illustrated in the following description may be divided into a plurality of blocks, or a plurality of blocks may be integrated into one block. In addition, the functions of the functional blocks described below are implemented as software programs, but some or all of the functional blocks may be implemented as hardware.

FIG. 1 is a block diagram illustrating a configuration example of a power transmitting apparatus 100 according to this embodiment. The power transmitting apparatus 100 includes, for example, a control unit 101, a power supply unit 102, a power transmitting circuit unit 103, a first communication unit 104, the power transmitting antenna 105, the second communication unit 106, and a memory 107. Note that the second communication unit 106 performs communication using an antenna (not illustrated).

The control unit 101 controls the entirety of the power transmitting apparatus. The control unit 101 also performs control related to power transmission control including communication for device authentication in the power transmitting apparatus. Furthermore, the control unit 101 may perform control for executing an application other than wireless power transfer. The control unit 101 includes one or more processors such as a CPU (Central Processing Unit) or an MPU (MicroProcessor Unit). Note that the control unit 101 may be configured by hardware such as an application specific integrated circuit (ASIC: Application Specific Integrated Circuit). The control unit 101 may include an array circuit such as an FPGA (Field Programmable Gate Array) compiled to execute a predetermined process. The control unit 101 causes the memory 107 to store information to be stored during execution of various processes. The control unit 101 can also measure time with a timer (not illustrated).

The power supply unit 102 is a power supply that supplies power when at least the control unit 101 and the power transmitting circuit unit 103 operate. The power supply unit 102 can be, for example, a wired power receiving circuit, a battery, or the like, which receives power from a commercial power supply. The battery stores power supplied from a commercial power supply.

The power transmitting circuit unit 103 converts DC or AC power input from the power supply unit 102 into AC frequency power in a frequency band used for wireless power transfer, and inputs the AC frequency power to the power transmitting antenna 105, thereby generating an electromagnetic wave to be received by RX. For example, the power transmitting circuit unit 103 converts a DC voltage supplied by the power supply unit 102 into an AC voltage by a switching circuit having a half-bridge or full-bridge configuration using a FET (Field Effect Transistor). In this case, the power transmitting circuit unit 103 includes a gate driver that controls ON/OFF of the FET.

The power transmitting circuit unit 103 controls the intensity of the electromagnetic wave to be output by adjusting one or both of a voltage (voltage of transmission power) and a current (current of transmission power) input to the power transmitting antenna 105. When the voltage of transmission power or the current of transmission power is increased, the intensity of the electromagnetic wave is increased, and when the voltage of transmission power or the current of transmission power is decreased, the intensity of the electromagnetic wave is decreased. In addition, the power transmitting circuit unit 103 performs output control of AC power, based on an instruction from the control unit 101, so that power transmission from the power transmitting antenna 105 is started or stopped. It is also assumed that the power transmitting circuit unit 103 has a capability of supplying power for outputting power of 15 watts (W) to a charging unit 206 of a power receiving apparatus 200 (RX) compatible with the WPC standard.

The first communication unit 104 performs communication for power transmission control based on the WPC standard as described above with a communication unit (a first communication unit 203 illustrated in FIG. 2) of the power receiving apparatus. The first communication unit 104 performs communication by modulating the electromagnetic wave output from the power transmitting antenna 105 and transferring information to the power receiving apparatus. In this case, the power transmitting apparatus performs modulation by frequency shift keying (FSK). The first communication unit 104 demodulates the electromagnetic wave modulated by the power receiving apparatus and transmitted from the power transmitting antenna 105, and acquires information transmitted from the power receiving apparatus. At this time, the power receiving apparatus performs modulation by load modulation or amplitude modulation as will be described later. That is, communication performed by the first communication unit 104 is performed by superimposing a signal on the electromagnetic wave transmitted from the power transmitting antenna 105. In addition, the first communication unit 104 may communicate with the power receiving apparatus by communication based on a standard different from the WPC standard using an antenna different from the power transmitting antenna 105, or may communicate with the power receiving apparatus by selectively using a plurality of types of communication. The first communication unit 104 performs the above-described IB communication.

The second communication unit 106 performs control communication for wireless power transfer based on the WPC standard with the communication unit (the second communication unit 204 illustrated in FIG. 2) of the power receiving apparatus. The second communication unit 106 performs so-called OOB communication using an antenna (not illustrated) different from the power transmitting antenna 105, using a frequency different from the frequency of the power transmitting circuit unit 103. In this embodiment, it is assumed that the second communication unit 106 performs communication based on a standard of Bluetooth 4.0 or later and is compatible with BLE. As the second communication unit 106, a communication unit compatible with another wireless communication method such as short range wireless communication (Near Field Communication, NFC) or Wi-Fi (registered trademark) may be used.

Note that in this embodiment, when using OOB communication for control communication with the power receiving apparatus, the power transmitting apparatus can supply a larger amount of power to the power receiving apparatus than when IB communication is used. For example, when the power transmitting apparatus performs control communication by OOB communication, the power transmitting apparatus can supply power so that the power output to the charging unit of the power receiving apparatus is 100 watts at the maximum. In IB communication, minute changes in voltage and current are superimposed on transmission power for communication. In contrast, when the transmission power is increased, noise generated from the power transmitting circuit unit or the power receiving circuit unit increases. Therefore, if IB communication is used, the transmission power is restricted so that the communication unit of IB communication can detect minute changes in voltage and current for communication. On the other hand, if OOB communication is used, since such a restriction is eliminated, power to be transmitted can be increased.

The memory 107 can also store the states of the power transmitting apparatus and the power receiving apparatus (the transmission power value, the reception power value, and the like) in addition to a control program. For example, the state of the power transmitting apparatus can be acquired by the control unit 101, and the state of the power receiving apparatus can be acquired by a control unit 201 of the power receiving apparatus, to be received via the first communication unit 104 or the second communication unit 106. The memory 107 stores the state of each element and the entire state of the power transmitting apparatus or the wireless power transfer system.

Although FIG. 1 illustrates the control unit 101, the power supply unit 102, the power transmitting circuit unit 103, the first communication unit 104, the memory 107, and the second communication unit 106 as separate blocks, two or more of these blocks may be integrated into a single chip or the like. In addition, one block may be divided into a plurality of blocks.

FIG. 2 is a block diagram illustrating a configuration example of the power receiving apparatus 200 according to this embodiment. The power receiving apparatus 200 includes, for example, the control unit 201, a power receiving circuit unit 202, the first communication unit 203, the second communication unit 204, the power receiving antenna 205, the charging unit 206, a battery 207, and a memory 208. Note that the second communication unit 204 performs communication using an antenna (not illustrated).

The control unit 201 controls the entirety of the power receiving apparatus by, for example, executing the control program stored in the memory 208. That is, the control unit 201 controls each of the functional units illustrated in FIG. 2. Furthermore, the control unit 201 may perform control for executing an application other than wireless power transfer. An example of the control unit 201 includes one or more processors such as a CPU and an MPU. Note that the entirety of the power receiving apparatus (the entirety of a smartphone if the power receiving apparatus is a smartphone) may be controlled in cooperation with an OS (Operating System) executed by the control unit 201.

In addition, the control unit 201 may also be configured by hardware such as an ASIC. The control unit 201 may also include an array circuit such as an FPGA compiled to execute a predetermined process. The control unit 201 causes the memory 208 to store information to be stored during execution of various processes. The control unit 201 can also measure time with a timer (not illustrated).

The power receiving circuit unit 202 acquires, via the power receiving antenna 205, AC power (AC voltage and AC current) generated by electromagnetic induction based on an electromagnetic wave radiated from the power transmitting antenna 105 of the power transmitting apparatus. Then, the power receiving circuit unit 202 converts the AC power into DC or AC power of a predetermined frequency, and outputs the power to the charging unit 206 that performs a process for charging the battery 207. That is, the power receiving circuit unit 202 includes a rectifying unit and a voltage control unit necessary for supplying power to the load in the power receiving apparatus. The above-described GP is the amount of power guaranteed to be output from the power receiving circuit unit 202. The power receiving circuit unit 202 is assumed to be capable of supplying power for the charging unit 206 to charge the battery 207 and supplying power for outputting power of 15 watts to the charging unit 206.

The first communication unit 203 performs control communication for wireless power transfer based on the WPC standard with the first communication unit 104 of the power transmitting apparatus. The first communication unit 203 demodulates the electromagnetic wave input from the power receiving antenna 205 and acquires information transmitted from the power transmitting apparatus. Here, the first communication unit 104 of the power transmitting apparatus performs communication by modulating, by frequency shift keying (FSK), the electromagnetic wave output from the power transmitting antenna 105 and transferring information to the power receiving apparatus. Then, the first communication unit 203 performs load modulation or amplitude modulation on the input electromagnetic wave to superimpose a signal related to information to be transmitted to the power transmitting apparatus on the electromagnetic wave, thereby performing communication with the power transmitting apparatus. This control communication is performed by IB communication in which the electromagnetic wave received by the power receiving antenna 205 is subjected to load modulation or amplitude modulation. In this embodiment, if the power receiving apparatus uses only IB communication for control communication with the power transmitting apparatus, the power receiving apparatus can wirelessly receive power from the power transmitting apparatus and output power of 15 watts at the maximum to the charging unit 206.

The second communication unit 204 performs control communication for wireless power transfer based on the WPC standard with the second communication unit 106 of the power transmitting apparatus. The second communication unit 204 performs OOB communication using an antenna (not illustrated) different from the power receiving antenna 205 using a frequency different from the frequency of the electromagnetic wave received by the power receiving circuit unit 202. In this embodiment, it is assumed that the second communication unit 204 performs communication based on a standard of Bluetooth 4.0 or later and is compatible with BLE. As the second communication unit 204, a communication unit compatible with another wireless communication method such as NFC or Wi-Fi may be used. In addition, the second communication unit 204 may be supplied with power from the battery 207, or may be directly supplied with power from the power receiving circuit unit 202. Note that in this embodiment, when using OOB communication for control communication with the power transmitting apparatus, the power receiving apparatus can wirelessly receive power from the power transmitting apparatus and output power of 100 watts at maximum to the charging unit 206.

The charging unit 206 charges the battery 207 using a DC voltage and a DC current supplied from the power receiving circuit unit 202.

The memory 208 stores the states or the like of the power transmitting apparatus and the power receiving apparatus in addition to the control program. For example, the state of the power receiving apparatus can be acquired by the control unit 201, and the state of the power transmitting apparatus can be acquired by the control unit 101 of the power transmitting apparatus, to be received via the first communication unit 203 or the second communication unit 204.

Although FIG. 2 illustrates the control unit 201, the power receiving circuit unit 202, the first communication unit 203, the second communication unit 204, the charging unit 206, and the memory 208 as separate blocks, two or more of these blocks may be integrated into a single chip or the like. In addition, one block may be divided into a plurality of blocks.

Note that the fact that the power transmitting apparatus or the power receiving apparatus is compatible with control communication by OOB communication is hereinafter expressed as being compatible with version A of the WPC standard. Version A of the WPC standard is a successor standard of WPC v1.2.3, and at least a control communication function by OOB communication is added.

Figure 3:
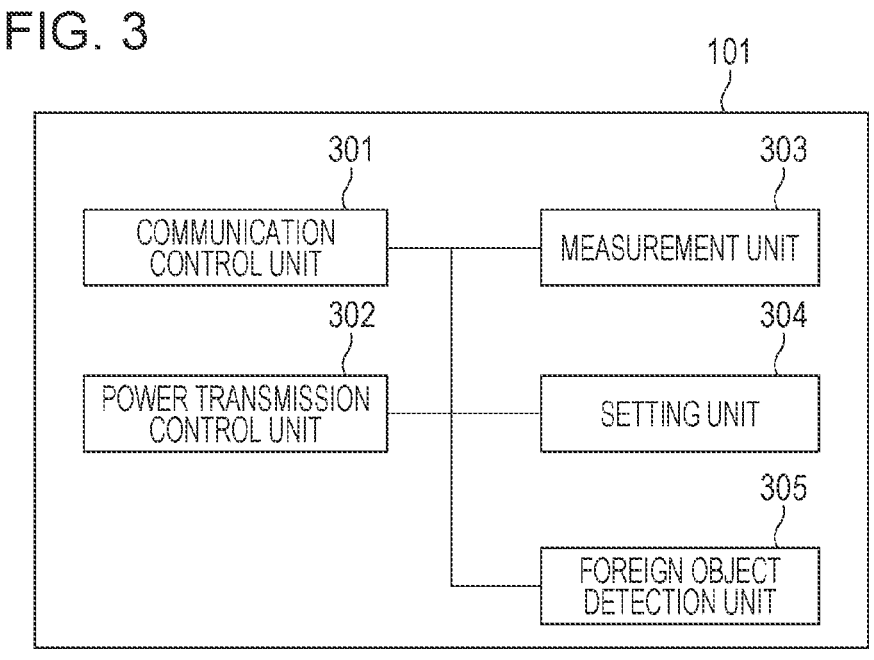
FIG. 3 is a block diagram illustrating a functional configuration example of a control unit of the power transmitting apparatus.

Next, functions of the control unit 101 of TX will be described with reference to FIG. 3. FIG. 3 is a block diagram illustrating a functional configuration example of the control unit 101 of the power transmitting apparatus 100 (TX). The control unit 101 includes a communication control unit 301, a power transmission control unit 302, a measurement unit 303, a setting unit 304, and a foreign object detection unit 305. The communication control unit 301 performs control communication with the power receiving apparatus based on the WPC standard via the first communication unit 104 or the second communication unit 106. The power transmission control unit 302 controls the power transmitting circuit unit 103 to control power transmission to the power receiving apparatus.

The measurement unit 303 measures power to be transmitted to the power receiving apparatus via the power transmitting circuit unit 103, and measures average transmission power per unit time. The measurement unit 303 also measures the Q value of the power transmitting antenna 105. The setting unit 304 sets a threshold used for foreign object detection by, for example, a calculation process, based on the average transmission power or the Q value measured by the measurement unit 303. The setting unit 304 may also have a function of setting a threshold serving as a reference for determining the presence or absence of a foreign object, which is necessary to perform the foreign object detection process using another method.

The foreign object detection unit 305 can perform the foreign object detection process, based on the threshold set by the setting unit 304 and the transmission power or the Q value measured by the measurement unit 303. In addition, the foreign object detection unit 305 may have a function for performing the foreign object detection process using another method. For example, in a TX having an NFC communication function, the foreign object detection unit 305 may perform the foreign object detection process using an opposing apparatus detection function based on the NFC standard. The foreign object detection unit 305 can also detect a change in the state of TX as a function other than the function of detecting a foreign object. For example, the power transmitting apparatus can also detect an increase or a decrease in the number of power receiving apparatuses 411 on the power transmitting apparatus.

The functions of the communication control unit 301, the power transmission control unit 302, the measurement unit 303, the setting unit 304, and the foreign object detection unit 305 are implemented as programs that operate in the control unit 101. The respective processing units are configured as independent programs, and can operate in parallel while synchronizing the programs by event processing or the like. However, two or more of these processing units may be incorporated in one program.

Process Flow

An example of a flow of a process executed in each apparatus in order to prevent the above-described cross connection will be described, and then, an example of a flow of a process of the entire system will be described. In particular, a method capable of preventing the cross connection even if the power receiving apparatus changes the BD_ADDR will be described.

Operation of Power Transmitting Apparatus

Hereinafter, an example of a flow of a process executed by the power transmitting apparatus 401 (TX1) will be described with reference to FIG. 5. Note that this process can be started in response to the power transmitting circuit unit 103 being powered on and activated by receiving power supply from the power supply unit 102 or the like. In addition, this process can be implemented by the control unit 101 executing a program stored in the memory 107. However, the present disclosure is not limited to this, and the process may be executed, for example, in response to a power transfer function being activated by a user operation such as pressing of a predetermined button. In addition, at least part of the process illustrated in FIG. 5 may be implemented by hardware. If at least part of the process is implemented by hardware, for example, a dedicated circuit automatically generated on an FPGA from a program for implementing the process step by using a predetermined compiler can be used. In addition, similarly to the FPGA, hardware for executing a predetermined process step may be implemented by a Gate Array circuit.

Upon start of this process, TX1 starts a process compliant with the WPC standard. In the WPC standard, a partner apparatus is specified through a Selection phase, a Ping phase, and an Identification & Configuration phase (I & C phase). Then, in a Negotiation phase, negotiation related to transmission power is conducted, and subsequently, through a Calibration phase for power transfer, the process in a Power Transfer phase (PT phase) in which actual power transfer is performed is executed.

Figure 5:
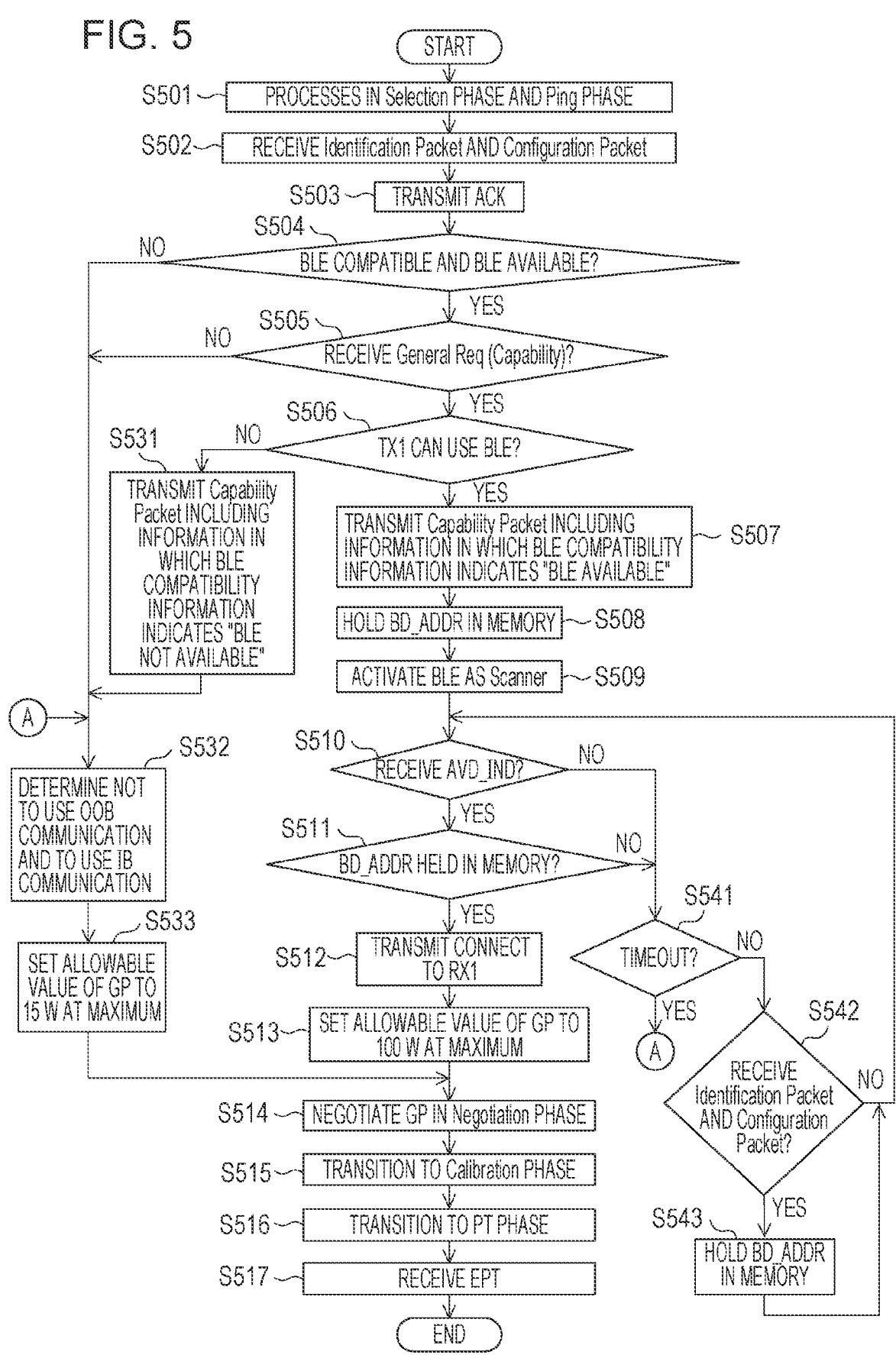
FIG. 5 is a flowchart illustrating a process example of the power transmitting apparatus in a first embodiment.

In FIG. 5, TX1 first the executes processes in the Selection phase and the Ping phase (S501). TX1 transmits an Analog Ping via the power transmitting antenna 105 in the Selection phase. The Analog Ping is minute power for detecting an object that is present in the vicinity of the power transmitting antenna 105. TX1 detects the voltage value or the current value of the power transmitting antenna at the time of transmission of the Analog Ping. If the voltage value is lower than a certain threshold, or if the current value exceeds a certain threshold, TX1 determines that an object is present in the vicinity and transitions to the Ping phase. Then, in the Ping phase, TX1 transmits a Digital Ping having a larger amount of power than the Analog Ping.

Here, the Digital Ping has sufficient power to activate the control unit 201, the first communication unit 203, and the second communication unit 204 of RX1 that is present in the vicinity of the power transmitting antenna 105. Upon the control unit 201 and the first communication unit 203 of RX1 being activated by the Digital Ping received via the power receiving antenna 205, TX1 is notified of the voltage value of reception power by IB communication by the first communication unit 203.

Upon being notified of the voltage value of reception power via the first communication unit 104, TX1 ends the process in the Ping phase and transitions to the I & C phase. In the I & C phase, TX1 receives an Identification Packet transmitted from RX1 (S502). In this case, TX1 may acquire information indicating whether RX1, which has transmitted the packet, is compatible with version A of the WPC standard, at least individual identification information of RX1 used in the WPC standard of a version earlier than version A, and identification information used in BLE. In one example, TX1 acquires, in the Identification Packet, identification information used by RX1 in the WPC standard, and checks whether an EXT bit indicating the presence of additional ID information is "1". Then, if the EXT bit is "1", TX1 acquires the additional ID information by an Extended Identification Packet subsequently transmitted according to the WPC standard. In this embodiment, it is assumed that the Extended Identification Packet stores a BD_ADDR of 8 bytes used by RX1 in BLE. The BD_ADDR is, for example, a Public Address defined by the BLE standard, which indicates individual identification information of a manufacturer of RX1 or the BLE communication function (the second communication unit 204). At this time, TX1 can recognize that the identification information of RX1 used in the WPC standard and the identification information in BLE correspond to each other (relate to the identical apparatus).

In the I & C phase, TX1 also receives a Configuration Packet transmitted from RX1 (S502). In this embodiment, BLE compatibility information indicating whether RX1, which has transmitted this packet, can use control communication by BLE is transmitted using the Configuration Packet. TX1 compatible with version A of the WPC standard can determine whether RX1 can use BLE as control communication at that time by monitoring the BLE compatibility information. This can prevent the power transmitting apparatus from erroneously determining that a power receiving apparatus not compliant with version A of the WPC standard can execute control communication by BLE. In addition, for example, it may be indicated whether control communication by OOB communication that is not limited to BLE can be executed. In addition, for each of the communication methods available for OOB communication other than BLE, an area similar to the BLE compatibility information indicating whether control communication is executable may be provided. For example, NFC compatibility information indicating whether an NFC communication function is provided may be provided.

Then, in response to reception of the Configuration Packet, TX1 transmits a positive response (ACK) by IB communication (S503). In response to transmission of the ACK, TX1 transitions to the Negotiation phase.

Based on the received Configuration Packet, TX1 determines whether RX1 is in a state where the control communication function by BLE is executable (S504). If RX1 is not in a state where control communication by BLE is executable (NO in S504), since control communication by BLE with RX1 is not executable, TX1 determines not to use OOB communication (S532). In this case, TX1 performs IB communication instead of OOB communication.

On the other hand, if RX1 has the control communication function by BLE and in a state where control communication by BLE is executable (YES in S504), TX1 determines whether RX1 has inquired about capability information (S505). The capability information inquiry is made by transmitting a General Request defined by the WPC standard from RX1 to TX1. Note that the General Request for inquiring about such capability information is hereinafter referred to as "General Req (Capability)".

If the General Req (Capability) is not received (NO in S505), TX1 proceeds to the processing in S532 and determines not to use OOB communication.

On the other hand, if the General Req (Capability) is received (YES in S505), TX1 transmits a Power Transmitter Capability Packet defined by the WPC standard to RX1. Hereinafter, the Power Transmitter Capability Packet is referred to as "TX Capability Packet". The TX Capability Packet includes information about the capability of the power transmitting apparatus, such as the maximum value of GP.

In this embodiment, the TX Capability Packet further includes BLE compatibility information. The BLE compatibility information has the same meaning as the BLE compatibility information in the Configuration Packet transmitted from RX1.

Prior to information transfer in the TX Capability Packet, TX1 determines whether TX1 is in a BLE available state (S506). If TX1 is not in the BLE available state (NO in S506), TX1 sets the BLE compatibility information in the TX Capability Packet to information indicating "not compatible" and transmits it to RX1 (S531) and proceeds to processing in S532.

Note that TX1 determines whether control communication by BLE is currently executable, based on, for example, whether TX1 has a BLE communication function, whether TX1 is operating as a BLE Peripheral, whether BLE is being used with another apparatus, or the like. For example, if TX1 is a Central, since TX1 can be connected with a plurality of Peripherals, TX1 can determine that the BLE is available for control communication. In addition, if TX1 is not performing communication with another apparatus by BLE, TX1 can determine that BLE is available for control communication. On the other hand, if TX1 as a Peripheral is performing communication with another apparatus by BLE, TX1 can determine that BLE is not available for control communication. In addition, TX1 may perform this determination through communication with a control unit of a product (for example, a printer) connected with TX1. For example, the control unit 101 of TX1 and the control unit of the product may be connected by GPIO (General Purpose Input/Output) or serial communication, and the control unit 101 of TX1 may inquire of the control unit of the product about the use status of BLE. In this case, if a response about the use status of BLE from the control unit of the product indicates that BLE is being used, the control unit 101 of TX1 can determine that BLE is currently not available for control communication. If the response indicates that BLE is not being used, the control unit 101 of TX1 can determine that BLE is available for control communication.

Then, if TX1 is in the BLE available state (YES in S506), TX1 sets the BLE compatibility information in the TX Capability Packet to information indicating "BLE available", and transmits it to RX1 (S507). Then, TX1 determines that BLE communication can be currently performed with RX1, and holds the BD_ADDR of RX1 acquired in S502 in a memory (S508). Note that TX1 may hold the BD_ADDR of RX1 in the memory at the time of acquisition in S502, and may discard the information if it is determined that TX1 is not in the BLE available state (NO in S506).

Note that after S507, TX1 may receive a signal from RX1 inquiring about the identification information of TX1 in BLE. This signal may be, for example, a General Request of the WPC standard. Hereinafter, the General Request for inquiring about the identification information in BLE is referred to as "General Request (ID)". Upon receiving the General Request (ID), TX1 transmits, to RX1, a response including the BD_ADDR of TX1 in BLE. This response may be a Power Transmitter Identification Packet (hereinafter referred to as "Power Transmitter Identification Packet TX ID Packet") defined in the WPC standard. The Power Transmitter Identification Packet TX ID Packet includes the version of the WPC standard compatible with the power transmitting apparatus and the identification number by the manufacturer or the like of the functional block related to IB communication of the power transmitting apparatus. Furthermore, the power transmitting apparatus compatible with version A can include, in this Power Transmitter Identification Packet TX ID Packet, the BD_ADDR in BLE. Accordingly, RX1 can recognize the identification information in the WPC standard of TX1 and the identification information (BD_ADDR) in BLE in association with each other.

Following the processing in S508, TX1 activates the BLE communication function of TX1 as a Scanner in order to attempt control communication with RX1 by BLE (S509). Note that the Scanner is one of the states defined in the BLE standard, and receives a broadcast ADVERTISE_INDICA-TION and finds a BLE device (or service) that has transmitted it. Hereinafter, the ADVERTISE_INDICATION is referred to as ADV_IND. The ADV_IND is a signal that is broadcast by a device in an Advertiser state defined by the BLE standard, and is used as a notification of the BD_ADDR of the device and supporting service information.

After being activated as a Scanner, TX1 waits for the ADV_IND to be transmitted. If the ADV_IND is not received (NO in S510), TX1 determines whether a timeout occurs in S541, and proceeds to S532 in a case of the timeout. If the timeout does not occur in S541, TX1 checks whether Identification Packet and Configuration Packet are received by IB communication (S542). If RX1 changes the BD_ADDR of RX1, TX1 is notified by IB communication. Then, TX1 can recognize that the BD_ADDR of RX1 is changed by receiving the notification. If Identification Packet and Configuration Packet are not received, the process proceeds to S510. If the Identification Packet and the Configuration Packet are received (Yes in S542), TX1 holds the changed new BD_ADDR of RX1 in the memory (S543). Subsequently, the process transitions to S510.

Then, if TX1 receives the ADV_IND including the BD_ADDR held in the memory (YES in S510 and S511) before a predetermined time elapses (before YES in S541), TX1 transmits a BLE-connection request message (S512). That is, if TX1 receives the ADV_IND from RX1 before the timeout, TX1 transmits the BLE connection request message to RX1. This connection request message is a CONNEC-T_REQ (hereinafter, may be referred to as "CONNECT") defined by the BLE standard. Based on this message, a communication connection with RX1 is established by BLE. TX1 then transitions to the Negotiation phase. Here, since BLE communication is possible, the negotiation in the Negotiation phase is conducted using BLE.

Note that even if TX1 receives the ADV_IND, the CONNECT is not transmitted if it is not the ADV_IND of the BD_ADDR held in the memory (NO in S511). That is, at the stage of attempting control communication for power transfer, TX1 limits the target to which the CONNECT is transmitted so that a BLE connection for a purpose different from that of such control communication is not established.

Subsequently, since OOB communication is available, TX1 sets the allowable value of GP to 100 W (S513). Then, TX1 transitions to the Negotiation phase and negotiates with RX1 for GP (S514). Then, after executing the process in the Calibration phase (S515), TX1 transitions to the PT phase (S516) and transfers power to RX1. Although control data for requesting an increase or a decrease in the transmission power is transmitted from RX1 to TX1 in the PT phase, since this communication is control communication, the communication is performed by BLE in a situation in which BLE (OOB communication) is available. Subsequently, upon receiving an End Power Transfer (EPT) for requesting the stop of power transfer due to the end of charging or the like from RX1 (S517), TX1 ends the power transfer process. Since the transmission/reception of the EPT is also control communication, it is performed by BLE in a situation where BLE (OOB communication) is available. That is, control communication for wireless power transfer is performed by BLE using the second communication unit 106.

As described above, TX1 checks whether RX1 can execute control communication by BLE. In addition, TX1 recognizes the identification information of RX1 in the WPC standard and the identification information thereof in BLE in association with each other, and transmits the CONNECT upon receiving the ADV_IND including the identification information of RX1 in BLE. As a result, it is possible to establish a BLE connection with a power transfer target, while not establishing a BLE connection with another apparatus that is not a power transfer target.

Operation of Power Receiving Apparatus

First, an example of a flow of a process executed by the power receiving apparatus (RX1) will be described with reference to FIG. 6. Note that this process can be executed, for example, in response to a power receiving function being activated by a user operation such as pressing of a predetermined button, or in response to RX1 being brought into the vicinity of TX1. Note that this process may be started in response to the control unit 201 and the first communication unit 203 being activated by power received via the power receiving antenna 205. Although this process can be implemented by the control unit 201 executing a program stored in the memory 208, dedicated hardware for executing the process to be described later may be used. For example, if at least part of the process is implemented by hardware, a dedicated circuit automatically generated on an FPGA from a program for implementing the process step by using a predetermined compiler can be used. In addition, similarly to the FPGA, hardware for executing a predetermined process step may be implemented by a Gate Array circuit.

Figure 6:
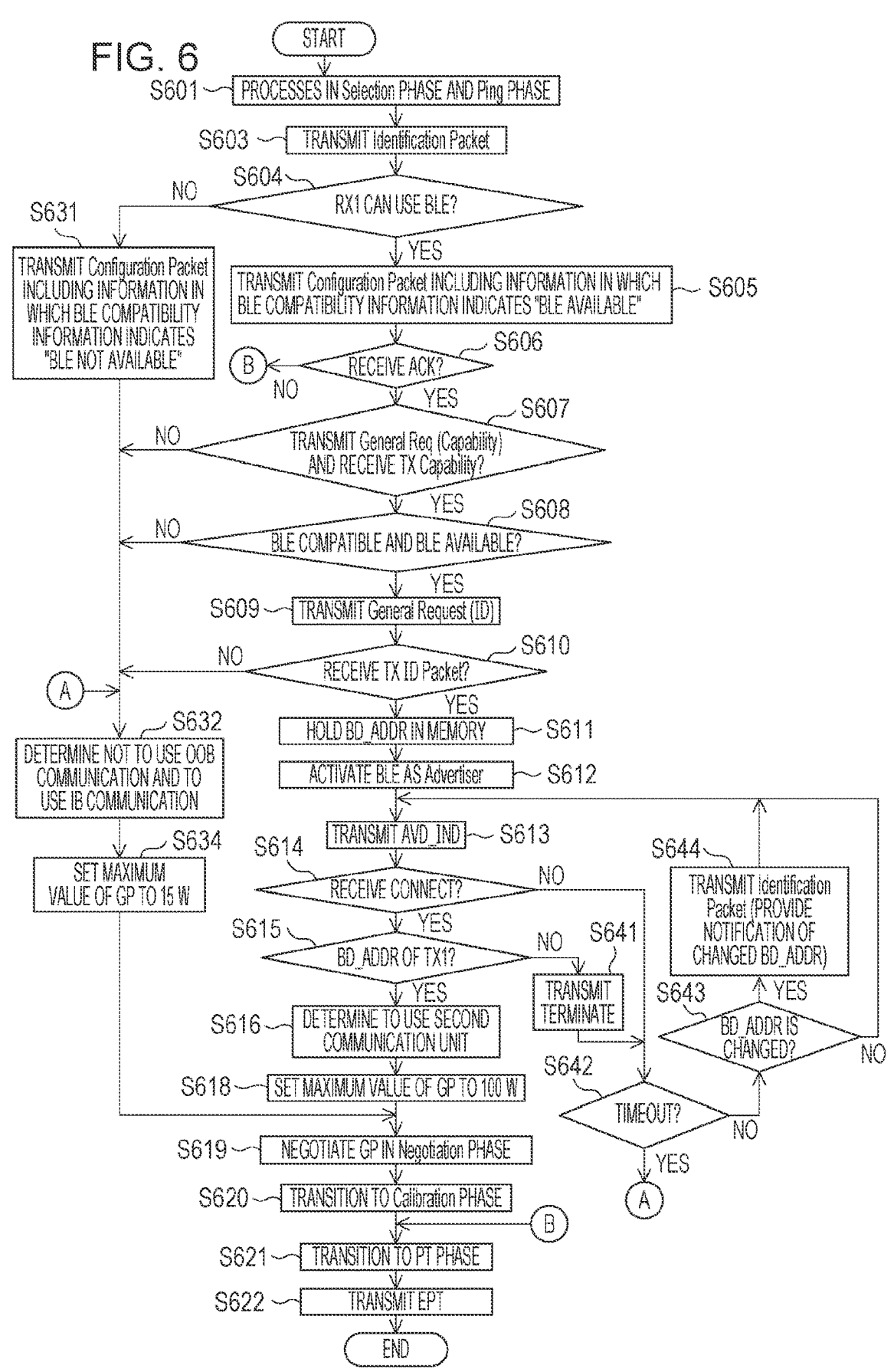
FIG. 6 is a flowchart illustrating a process example of the power receiving apparatus in the first embodiment.

In FIG. 6, RX1 is first detected by TX1 by being placed in the vicinity of TX1, which causes TX1 to transmit a Digital Ping. Then, the control unit 201 and the first communication unit 203 of RX1 are activated by the Digital Ping received via the power receiving antenna 205, and measure the voltage of reception power of the Digital Ping. Then, RX1 notifies TX1 of the voltage of reception power by IB communication (S601).

Subsequently, RX1 transitions to the I & C phase. In the I & C phase, RX1 transmits an Identification Packet to TX1 by IB communication (S603). In this case, the Identification Packet includes information indicating whether RX1 is compatible with version A of the WPC standard, and at least individual identification information used in the WPC standard of a version earlier than version A. Note that the individual identification information used in the WPC standard is identification information used when control communication is performed by IB communication. In addition, RX1 may set and transmit, in the Identification Packet, an EXT bit indicating whether additional ID information is present. If the additional ID information is present, RX1 sets the EXT bit in the Identification Packet to "1" and transmits an Extended Identification Packet for transmitting the additional ID information. The Extended Identification Packet is also transmitted by IB communication based on the WPC standard. In this embodiment, a BD_ADDR of 8 bytes used in BLE is transmitted in the Extended Identification Packet.

After transmitting the Identification Packet, RX1 transmits a Configuration Packet. At this time, first, RX1 determines whether RX1 is in a state in which BLE is currently available for control communication (S604). It is determined whether BLE is available for control communication, based on, for example, whether RX1 has a BLE communication function, whether RX1 is operating as a BLE Peripheral, whether BLE is being used with another apparatus, or the like. For example, if RX1 is a Central, since RX1 can be connected with a plurality of Peripherals, RX1 can determine that BLE is available for control communication. In addition, if RX1 is not performing communication with another apparatus by BLE, RX1 can determine that BLE is available for control communication. On the other hand, if RX1 as a Peripheral is performing communication with another apparatus by BLE, RX1 can determine that BLE is not available for control communication. In addition, RX1 may perform this determination through communication with a control unit of a product (for example, a smartphone or a camera) connected with RX1. For example, the control unit 201 of RX1 and the control unit of the product may be connected by GPIO (General Purpose Input/Output) or serial communication, and the control unit 201 of RX1 may inquire of the control unit of the product about the use status of BLE. In this case, if a response about the use status of BLE from the control unit of the product indicates that BLE is being used, the control unit 201 of RX1 can determine that BLE is not available for control communication at that time. If the response indicates that BLE is not being used, the control unit 201 of RX1 can determine that BLE is available for control communication. Note that information indicating whether RX1 is compatible with BLE communication and whether BLE is available for control communication can be transmitted by being included in the Configuration Packet.

If BLE is not currently available for control communication by RX1 (NO in S604), RX1 transmits, to TX1 by IB communication, the Configuration Packet including information indicating that control communication by BLE is not available (S631). Then, since it is not possible for RX1 to perform control communication by BLE with TX1, RX1 determines not to use OOB communication (S632). Then, RX1 determines that the maximum value of the requested GP is 15 watts (W) (S634) and advances the process to S619.

On the other hand, if BLE is currently available for control communication by RX1 (YES in S604), RX1 transmits, to TX1 by IB communication, the Configuration Packet including information indicating that control communication by BLE is available (S605).

Subsequently, RX1 waits for an ACK from TX1 (S606). If the ACK is not received (NO in S606), RX1 transitions to the PT phase (S621) and receives power transmitted from TX1. Then, for example, in response to determination to end power transfer upon completion of charging of the battery 207 or the like, RX1 transmits an EPT to TX1 (S622) and ends the process. A power transmitting apparatus that is compatible with only a version earlier than version 1.2 of the WPC standard is not compatible with the Negotiation phase and the Calibration phase. For this reason, upon receiving the Configuration Packet, such a power transmitting apparatus transitions to the PT phase without transmitting an ACK. For this reason, if the ACK is not received from TX1, RX1 transitions to the PT phase. Thus, even if TX1 is a power transmitting apparatus of a version earlier than version 1.2 of the WPC standard, RX1 can receive power. That is, with such a configuration, RX1 can ensure backward compatibility. If the ACK is not received, the maximum value of power that the power receiving circuit unit 202 can supply to the load (the charging unit 206 and the battery 207) is limited to 5 watts.

If the ACK is received (YES in S606), RX1 ends the I & C phase and transitions to the Negotiation phase. Then, RX1 transmits a General Req (Capability) for inquiring about the capability information of TX1 and waits for a response (TX Capability Packet) (S607). Then, if the TX Capability Packet is not received (NO in S607), RX1 determines not to use OOB communication (S632) and executes the process in and after S634 described above. On the other hand, if the TX Capability Packet is received (YES in S607), RX1 checks the bit indicating the BLE compatibility information in the TX Capability Packet. Then, RX1 determines whether TX1 can execute control communication by BLE (S608). If it is determined that it is not possible for TX1 to execute control communication by BLE (NO in S608), the process proceeds to S632.

If it is determined that TX1 can execute control communication by BLE (YES in S608), RX1 transmits a General Request (ID) in order to acquire the identification information of TX1 in BLE (S609). Then, RX1 waits for a Power Transmitter Identification Packet TX ID Packet from TX1 as a response to the General Request (ID) (S610). If the Power Transmitter Identification Packet TX ID Packet is not received from TX1 (NO in S610), RX1 determines not to use OOB communication (S632) and executes the process in and after S634 described above.

On the other hand, if RX1 receives the Power Transmitter Identification Packet TX ID Packet from TX1 compatible with version A of the WPC standard (YES in S610), RX1 acquires the BD_ADDR of TX1 stored in the packet and holds the BD_ADDR in the memory 208 (S611). At this time, RX1 can recognize the identification information of TX1 in the WPC standard and the BD_ADDR thereof in BLE in association with each other. Then, in order to perform control communication by BLE with TX1, RX1 activates RX1 as a BLE Advertiser (S612) and broadcasts an ADV_IND (S613). Note that the Advertiser is one of the states defined by the BLE standard and has a role of providing a notification of the BD_ADDR of the apparatus and supporting service information in the ADV_IND so that the above-described Scanner can find a BLE device (or service). Here, the ADV_IND includes a UUID (universally unique IDentifier) indicating a service (profile) supported by the second communication unit 204. Note that in this embodiment, the ADV_IND includes a UUID indicating a wireless charging service using OOB communication based on the WPC standard (hereinafter referred to as "wireless charging service"). The ADV_IND can also include information such as a device type (for example, a camera or a smartphone), a manufacturer name, a model name, and a serial number of a product with which the power receiving apparatus (RX1) is connected.

Subsequently, RX1 waits for a CONNECT transmitted from the Scanner that has received the ADV_IND (S614). Then, upon receiving the CONNECT (YES in S614), RX1 determines whether the identification information of the transmission source of the CONNECT is held in the memory 208 as the identification information (BD_ADDR) of TX1 (S615). That is, RX1 determines whether the transmission source of the CONNECT is TX1. If the transmission source of the CONNECT is not TX1 (NO in S615), RX1 transmits an LL_TERMINATE_IND indicating that the BLE connection established by the CONNECT is to be disconnected to the apparatus that is the transmission source of the CONNECT (S641). Hereinafter, the LL_TERMINATE_IND is referred to as "TERMINATE". If a timeout occurs without receiving the CONNECT from TX1 (YES in S642), RX1 determines not to use OOB communication (S632), and executes the process at and after S634 described above.

In addition, if the CONNECT from TX1 is not received (NO in S614 or S615) and a timeout has not occurred (during NO in S642), RX1 checks whether the BD_ADDR of RX1 is changed. This is because RX1 may change the BD_ADDR as described above. In S643, it is checked whether RX1 has updated the BD_ADDR to a new BD_ADDR. If RX1 determines that the BD_ADDR has not been updated to the new BD_ADDR (NO in S643), RX1 transmits an ADV_IND (S613). If RX1 determines that the BD_ADDR has been updated to the new BD_ADDR (YES in S643), RX1 transmits an Identification Packet to TX1 by IB communication (S644). As described above, the Identification Packet includes information indicating whether RX1 is compatible with version A of the WPC standard, and at least individual identification information used in the WPC standard of a version earlier than version A. Note that the individual identification information used in the WPC standard is identification information used when control communication is performed by IB communication. In addition, RX1 may set and transmit, in the Identification Packet, an EXT bit indicating whether additional ID information is present. If the additional ID information is present, RX1 sets the EXT bit in the Identification Packet to "1" and transmits an Extended Identification Packet for transmitting the additional ID information. The Extended Identification Packet is also transmitted by IB communication based on the WPC standard. In this embodiment, a BD_ADDR of 8 bytes used in BLE is transmitted in the Extended Identification Packet. As described above, RX1 regularly checks whether the BD_ADDR of RX1 is changed, and if the BD_ADDR is changed, TX1 is notified of the changed BD_ADDR by IB communication. Accordingly, RX1 can notify TX1 of the changed BD_ADDR, and BLE communication of OOB communication can be established by exchanging the correct BD_ADDR at the present time between TX1 and RX1. After transmitting the Identification Packet (S644), RX1 returns to S613 and transmits an ADV_IND including information of the changed new BD_ADDR.

On the other hand, if the CONNECT from TX1 is received (YES in S614 and S615), RX1 determines to use OOB communication (S616), and RX1 and TX1 establish a connection by OOB communication. Subsequently, RX1 determines that the maximum value of the requested GP is 100 watts (W) (S618). Subsequently, RX1 advances the process to S619. In S619, RX1 negotiates the GP with TX1. This negotiation is performed based on the maximum value of the GP allowable in TX1 and the value of the GP requested by RX1. As described above, the maximum value of the GP requested by RX1 is determined according to whether OOB communication is available by the processing in the S634 or the S618. Subsequently, after executing the process in the Calibration phase (S620), RX1 transitions to the PT phase (S621) and receives power from TX1. Although control data for requesting an increase or a decrease in the transmission power is transmitted from RX1 to TX1 in the PT phase, since this communication is control communication, the communication is performed by BLE in a situation in which BLE (OOB communication) is available.

Subsequently, for example, upon completion of charging, RX1 transmits, to TX1 by BLE (OOB communication), an EPT indicating a request to stop power transmission for battery charging (S622). Then, RX1 transmits a TERMI- NATE for disconnecting the BLE connection as necessary, and ends this process. Note that TX1 may transmit the TERMINATE after transmission of the EPT.

As described above, RX1 checks whether TX1 can execute control communication by BLE. In addition, RX1 recognizes the identification information of TX1 in the WPC standard and the identification information thereof in BLE in association with each other, and, if the CONNECT not including the identification information of TX1 in BLE is received, disconnects the connection and accepts only the CONNECT from TX1. As a result, it is possible to establish a BLE connection with a power transfer target, while not establishing a BLE connection with another apparatus that is not a power transfer target.

In addition, it is regularly checked whether the BD_ADDR of RX1 is changed, and if it is determined that the BD_ADDR is changed, TX1 is notified of the changed new BD_ADDR of RX1 by IB communication. Accordingly, even if the BD_ADDR of RX1 is changed, it is possible to establish a connection with the power transfer target by BLE (OOB communication).

Process Flow of Power Transfer System

Figure 7:
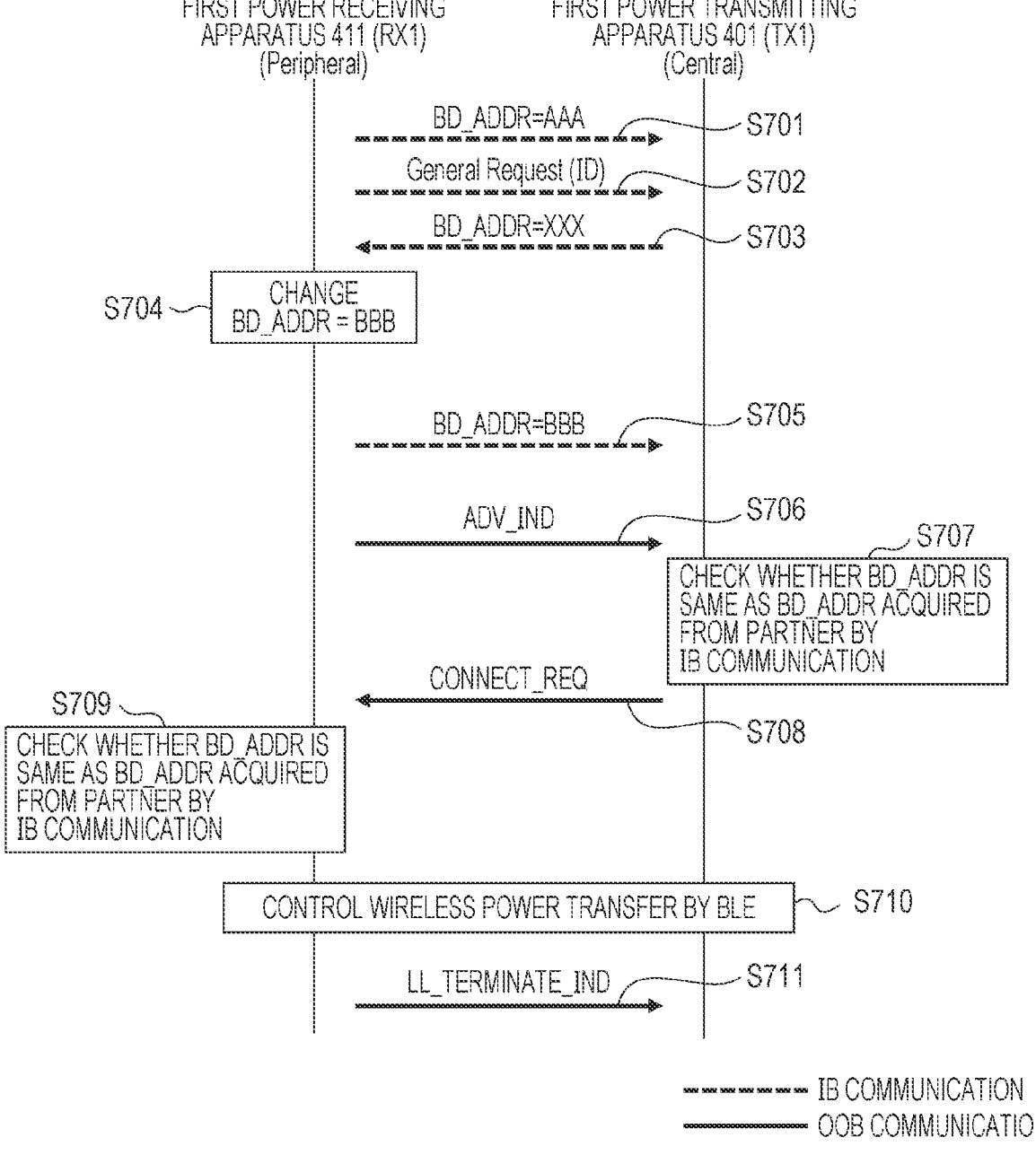
FIG. 7 is a sequence diagram illustrating a process example for performing wireless power transfer in the first embodiment.

Next, an example of a flow of a process executed in a power transfer system will be described with reference to FIG. 7. FIG. 7 is a sequence diagram illustrating operations for preventing a cross connection in the first power receiving apparatus 411 (RX1) and the first power transmitting apparatus 401 (TX1) illustrated in FIG. 4, which will be described in this embodiment. Note that in FIG. 7, dashed arrows indicate exchanges between RX1 and TX1 by IB communication. Solid arrows indicate exchanges between RX1 and TX1 by OOB communication.

First, RX1 operating as a Peripheral in BLE communication notifies TX1 operating as a Central in BLE communication of the BD_ADDR of RX1 (S701). The BD_ADDR is transmitted by being included in an Identification Packet or Extended ID Packet by IB communication.

In this case, the BD_ADDR of RX1 is assumed to be AAA. As described above, the BD_ADDR is the individual identification information of the BLE communication function (the second communication unit 204). TX1 holds the BD_ADDR acquired in S601 in a memory. Subsequently, RX1 transmits a signal for inquiring about the BD_ADDR to TX1 (S702). This signal may be the above-described General Request (ID). Upon receiving the General Request (ID), TX1 transmits a response including the BD_ADDR of TX1 in BLE to RX1 (S703). In this case, the BD_ADDR of TX1 is assumed to be XXX. This response may be a Power Transmitter Identification Packet TX ID Packet as described above. RX1 holds XXX, which is the BD_ADDR of TX1, in a memory.

When the above-described process from S701 to S703 is completed so that TX1 and RX1 can notify the partner of each other's BD_ADDR and recognize the partner's BD_ADDR, the following is performed. That is, TX1 activates the BLE communication function of TX1 as a Scanner in order to attempt control communication with RX1 by BLE (not illustrated). On the other hand, RX1 starts broadcast transmission of an ADVERTISE_INDICATION (not illustrated).

As described above, by the process from S701 to S703, TX1 and RX1 can notify the partner of each other's BD_ADDR by IB communication and recognize the partner's BD_ADDR. IB communication is communication performed by superimposing a signal on an electromagnetic wave transmitted from the power transmitting antenna 105. Basically, only RX1 can communicate with TX1. Therefore, by the process from S701 to S703 by IB communication, TX1 can recognize the BD_ADDR of RX1, which is the power transmission target, and RX1 can recognize the BD_ADDR of TX1, which transmits power to RX1. When OOB communication is performed based on these BD_ADDRs, the above-described cross connection does not occur. However, some devices change the identification information (BD_ADDR) in BLE communication regularly or irregularly, for example, for privacy protection. If the power transmitting apparatus and the power receiving apparatus recognize the partner's BD_ADDR in the above-described process from S701 to S703 and the BD_ADDR is changed before the connection by BLE communication is completed, it is not possible for the power transmitting apparatus and the power receiving apparatus to be connected by BLE communication. A solution in this case is as follows.

In this embodiment, RX1 is assumed to change the BD_ADDR. RX1 changes the BD_ADDR (S704). In this case, RX1 is assumed to change the BD_ADDR from AAA to BBB. Here, an example of a method of changing the BD_ADDR of RX1 will be described. First, a host CPU that controls the entirety of the power receiving apparatus transmits an LE_Set_Advertising_Enable (stop) command defined by the Bluetooth standard to the communication control unit 301 that controls the second communication unit 204. Thus, the ADVERTISE_INDICATION is temporarily stopped. Subsequently, the BD_ADDR is changed by an HCI_LE_Set_Random_Address command.

Subsequently, RX1 notifies TX1 of BBB, which is the changed new BD_ADDR, by IB communication (S705). This can be implemented by the host CPU that controls the entirety of RX1 controlling (transmitting a command to) the communication control unit 301 that controls the first communication unit 203 so as to notify TX1 of BBB, which is the changed new BD_ADDR. Note that the order of S705 and S704 may be reversed. That is, after determining to change the BD_ADDR, RX1 provides a notification of BBB, which is the changed new BD_ADDR (S705). Then, RX1 changes the BD_ADDR of RX1 to BBB (S704). Alternatively, S704 and S705 may be performed at the same timing. That is, RX1 may change the BD_ADDR (S704) and provide a notification of the changed new BD_ADDR (S705) at the same time. Then, TX1 holds the acquired new BD_ADDR in the memory.

Subsequently, RX1 starts broadcast transmission of an ADVERTISE_INDICATION including information of the new BD_ADDR by BLE communication, which is OOB communication (S706). Here, RX1 starts broadcast transmission of an ADVERTISE_INDICATION including BBB, which is the changed new BD_ADDR. First, the host CPU that controls the entirety of the power receiving apparatus transmits an LE_Set_Advertising_Enable (start) command defined by the Bluetooth standard to the communication control unit 301 that controls the second communication unit 204. In response to this, the ADVERTISE_INDICATION advertisement is restarted. Thus, the changed BD_ADDR is included in the restarted ADVERTISE_INDICATION. By performing the above-described process at predetermined time intervals, the BD_ADDR of RX1 can be changed at predetermined time intervals.

On the other hand, TX1 receives the ADVERTISE_INDI-CATION and checks whether the BD_ADDR included in the ADVERTISE_INDICATION corresponds to the information of the BD_ADDR obtained from RX1 by IB communication (S707). That is, TX1 checks whether BBB, which is the BD_ADDR of RX1 obtained by IB communication (S706), corresponds to BBB, which is the BD_ADDR of RX1 obtained from the ADVERTISE_INDICATION by OOB communication (BLE communication). Then, if the BD_ADDR of RX1 obtained by IB communication corresponds to the BD_ADDR of RX1 obtained from the ADVERTISE_INDICATION by OOB communication, TX1 transmits a BLE connection request message to RX1 (S708). This connection request message is a CONNECT_REQ defined by the BLE standard.

Note that even if TX1 receives the ADV_IND, TX1 does not transmit a CONNECT if the ADV_IND is not the ADV_IND of the BD_ADDR held in S705. That is, at the stage of attempting control communication for power transfer, TX1 limits the target to which the CONNECT is transmitted so that a BLE connection for a purpose different from that of such control communication is not established.

Upon receiving the CONNECT_REQ transmitted from TX1, RX1 determines whether the identification information of the transmission source of the CONNECT is held in the memory as the identification information (BD_ADDR) of TX1 (S709). That is, RX1 determines whether the transmission source of the CONNECT is TX1. Upon determining that the transmission source of the CONNECT is TX1, RX1 establishes BLE communication with TX1. Then, wireless power transfer is controlled by BLE communication (S710). Then, upon completion of charging, RX1 transmits an LL_TERMINATE_IND indicating that the BLE connection established by the CONNECT is to be disconnected to the apparatus that is the transmission source of the CONNECT (S711). Hereinafter, the LL_TERMINATE_IND is referred to as "TERMINATE".

On the other hand, if RX1 determines that the transmission source of the CONNECT is not TX1, RX1 transmits the LL_TERMINATE_IND indicating that the BLE connection established by the CONNECT is to be disconnected to the apparatus of the transmission source of the CONNECT. If the CONNECT from TX1 is not received, RX1 repeatedly transmits the ADV_IND until a predetermined time elapses after the start of transmission of the ADV_IND and a timeout occurs. If a timeout occurs without receiving the CONNECT from TX1, RX1 determines not to use OOB communication.

Accordingly, it is possible to establish a BLE connection with a power transfer target, while not establishing a BLE connection with another apparatus that is not a power transfer target. In addition, it is regularly checked whether the BD_ADDR of RX1 is changed, and if it is determined that the BD_ADDR of RX1 is changed, TX1 is notified of the changed new BD_ADDR of RX1 by IB communication. Accordingly, even if the BD_ADDR of RX1 is changed, it is possible to establish a BLE connection with the power transfer target.

This also enables the power transmitting apparatus and the power receiving apparatus to perform control communication by BLE with the power receiving apparatus and the power transmitting apparatus within the power transmission/reception range prior to power transmission/reception for charging the battery and negotiation of the power. By performing control communication by OOB communication in this way, it is possible to transmit and receive a larger amount of power than in a case of IB communication.

In addition, if BLE is not available even if the partner apparatus is compatible with BLE, the power transmitting apparatus and the power receiving apparatus determine not to use OOB communication but to use IB communication. Accordingly, the power transmitting apparatus and the power receiving apparatus can transmit and receive power using IB communication if BLE has already been used by a control unit of a product with which the partner apparatus is connected.

In addition, RX1 requests transmission of the BD_ADDR of TX1 by transmitting the General Request (ID) in the above-described embodiment. However, the present disclosure is not limited to this. For this request, for example, a Reserved Packet or Proprietary Packet of which the Packet type is not defined among Specific Requests of version 1.2.3 of the WPC standard may be used. In addition, in this request, a Reserved Packet or Proprietary Packet of which the Packet type is not defined among General Requests of version 1.2.3 of the WPC standard may be used. In addition, a packet other than the Specific Requests or General Requests among packets of version 1.2.3 of the WPC standard may be used for this request. For example, a Reserved Packet or Proprietary Packet of which the Packet type is not defined other than the Specific Requests or General Requests may be used for this request.

In addition, in the above description, RX1 notifies TX1 that RX1 is compatible with control communication by BLE using a Configuration Packet. However, the present disclosure is not limited to this. For example, this notification may be provided in a Reserved Packet or Proprietary Packet of which the Packet type is not defined among Specific Requests of version 1.2.3 of the WPC standard. In addition, a Reserved Packet or Proprietary Packet of which the Packet type is not defined among General Requests of version 1.2.3 of the WPC standard may be used for this notification. In addition, a packet other than the Specific Requests or General Requests among packets of version 1.2.3 of the WPC standard may be used for this notification. For example, a Reserved Packet or Proprietary Packet of which the Packet type is not defined other than the Specific Requests or General Requests may be used.

In addition, in the above description, the BD_ADDR is a Public Address defined by the BLE standard indicating the manufacturer of the power transmitting apparatus or the power receiving apparatus or the individual identification information of the BLE communication circuit (second communication unit). However, the present disclosure is not limited to this. For example, the BD_ADDR may be a random number automatically generated by the second communication unit such as a Random Address defined by the BLE standard. In addition, any one of a Static Device Address, a Resolvable Private Address, and a Non-resolvable Private Address among the Random Addresses may be used. Here, the Static Device Address is a random number address generated each time the second communication unit (BLE communication circuit) is powered on. The Non-resolvable Private Address is a random number address generated at regular time intervals. The Resolvable Private Address is an address generated based on an encryption key exchanged between the Central and the Peripheral.

In addition, in the above description, RX1 transmits the ADV_IND, and transmits the TERMINATE in response to the CONNECT from a BLE-compatible apparatus (for example, the first communication apparatus 421 or TX2) other than TX1 that has transmitted the BD_ADDR by IB communication. Alternatively, an ADV_DIRECT_IND, which is defined by the BLE standard and can directly designate the BD_ADDR of the BLE-compatible apparatus that transmits the CONNECT may be transmitted. For example, RX1 transmits the ADV_DIRECT_IND in which the BD_ADDR of TX1 is stored. In this case, only TX1 whose BD_ADDR is designated transmits the CONNECT, and the first communication apparatus 421 does not transmit the CONNECT. Therefore, the BLE connection process can be simplified.

Second Embodiment

In the first embodiment, a method has been described in which, if the BD_ADDR of the power receiving apparatus is changed, the power receiving apparatus notifies the power transmitting apparatus of the new BD_ADDR by IB communication. In this embodiment, a method of notifying TX1 of the new BD_ADDR by a method different from that in the first embodiment will be described.

Figure 8:
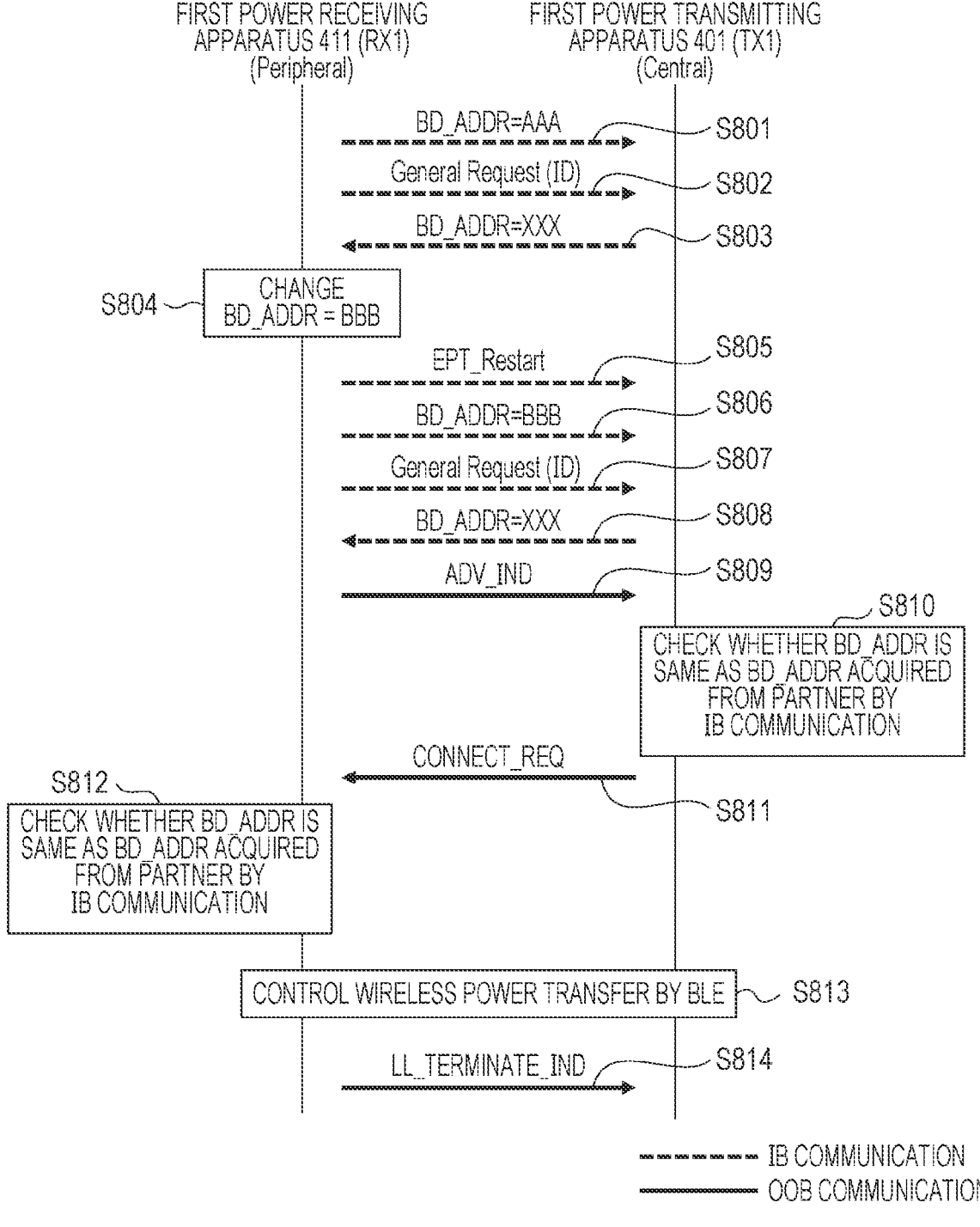
FIG. 8 is a sequence diagram illustrating a process example for performing wireless power transfer in a second embodiment.

An example of a flow of a process executed by a power transfer system described in this embodiment will be described with reference to FIG. 8. FIG. 8 is a sequence diagram illustrating operations for preventing a cross connection in the first power receiving apparatus 411 (RX1) and the first power transmitting apparatus 401 (TX1) illustrated in FIG. 4, which will be described in this embodiment. Note that in FIG. 8, dashed arrows indicate exchanges between RX1 and TX1 by IB communication. Solid arrows indicate exchanges between RX1 and TX1 by OOB communication. Note that the flow of the process executed by TX1 is mostly the same as that in FIG. 5 described in the first embodiment, and only different operations will be described. The flow of the process executed by RX1 is mostly the same as that in FIG. 6 described in the first embodiment, and only different operations will be described.

First, RX1 operating as a Peripheral in BLE communication notifies TX1 operating as a Central in BLE communication of the BD_ADDR of RX1 (S801). The BD_ADDR is transmitted by being included in an Identification Packet or Extended ID Packet by IB communication.

In this case, the BD_ADDR of RX1 is assumed to be AAA. As described above, the BD_ADDR is the individual identification information of the BLE communication function (the second communication unit 204). TX1 holds the BD_ADDR acquired in S801 in a memory. Subsequently, RX1 transmits a signal for inquiring about the BD_ADDR to TX1 (S802). This signal may be the above-described General Request (ID). Upon receiving the General Request (ID), TX1 transmits a response including the BD_ADDR of TX1 in BLE to RX1 (S803). In this case, the BD_ADDR of TX1 is assumed to be XXX. This response may be a Power Transmitter Identification Packet TX ID Packet as described above. RX1 holds XXX, which is the BD_ADDR of TX1, in a memory.

When the above-described process from S801 to S803 is completed so that TX1 and RX1 can notify the partner of each other's BD_ADDR and recognize the partner's BD_ADDR, the following is performed. That is, TX1 activates the BLE communication function of TX1 as a Scanner in order to attempt control communication with RX1 by BLE (not illustrated). On the other hand, RX1 starts broadcast transmission of an ADVERTISE_INDICATION (not illustrated).

As described above, by the process from S801 to S803, TX1 and RX1 can notify the partner of each other's BD_ADDR by IB communication and recognize the partner's BD_ADDR. IB communication is communication performed by superimposing a signal on an electromagnetic wave transmitted from the power transmitting antenna 105. Basically, only RX1 can communicate with TX1. Therefore, by the process from S801 to S803 by IB communication, TX1 can recognize the BD_ADDR of RX1, which is the power transmission target, and RX1 can recognize the BD_ADDR of TX1, which transmits power to RX1. When OOB communication is performed based on these BD_ADDRs, the above-described cross connection does not occur. However, some devices change the identification information (BD_ADDR) in BLE communication regularly or irregularly, for example, for privacy protection. If the power transmitting apparatus and the power receiving apparatus recognize the partner's BD_ADDR in the above-described process from S801 to S803 and the BD_ADDR is changed before the connection by BLE communication is completed, it is not possible for the power transmitting apparatus and the power receiving apparatus to be connected by BLE communication. A solution in this case is as follows.

In this embodiment, RX1 is assumed to change the BD_ADDR. RX1 changes the BD_ADDR (S804). In this case, RX1 is assumed to change the BD_ADDR from AAA to BBB.

Subsequently, RX1 transmits an End Power Transfer Packet to TX1 by IB communication (S805). Specifically, an End Power Transfer Packet including a value representing Restart Power Transfer is transmitted as an End Power Transfer Code. This can be implemented by a host CPU that controls the entirety of RX1 controlling (transmitting a command to) the communication control unit 301 that controls the first communication unit 203 so as to transmit the End Power Transfer Packet.

In this case, the End Power Transfer Packet is transmitted instead in S644 in FIG. 6 in the flow representing the operations of RX1 described in the first embodiment. Upon receiving the End Power Transfer Packet, TX1 stops power transmission in a case of performing power transmission, detects the presence or absence of a foreign object, and transitions to the Ping phase. In addition, RX1 is reset simultaneously with the transmission of the End Power Transfer Packet and returns to the initial state. That is, TX1 transitions to S501 in FIG. 5, and RX1 transitions to S601 in FIG. 6. Since both TX1 and RX1 transition to the initial states of the flows in FIGS. 5 and 6, the process from S801 to S803 by IB communication is executed again (S806 to S808). That is, since RX1 notifies TX1 of the changed new BD_ADDR in S806, it is possible to obtain the same effect as that in S705 in FIG. 7 described in the first embodiment. Then, TX1 holds the acquired new BD_ADDR in the memory.

Since S809 to S814 are the same as S706 to S711 in FIG. 7 in the first embodiment, a description thereof is omitted.

As described above, upon the BD_ADDR of RX1 being changed, RX1 transmits the End Power Transfer Packet to TX1 by IB communication. Once TX1 and RX1 are reset due to the stop of power transmission, TX1 can be notified of the changed new BD_ADDR of RX1. Accordingly, it is possible to establish a BLE connection with a power transfer target, while not establishing a BLE connection with another apparatus that is not a power transfer target. In addition, even if the BD_ADDR of RX1 is changed, it is possible to establish a BLE connection with the power transfer target.

Third Embodiment

In the first and second embodiments, a method has been described in which, if the BD_ADDR of RX1 is changed, the power receiving apparatus notifies the power transmitting apparatus of the changed new BD_ADDR by IB communication. In this embodiment, a method will be described in which, if the BD_ADDR of the power receiving apparatus is changed, control is performed so that a cross connection does not occur even if the power receiving apparatus does not notify the power transmitting apparatus of the changed new BD_ADDR.

Figure 9:
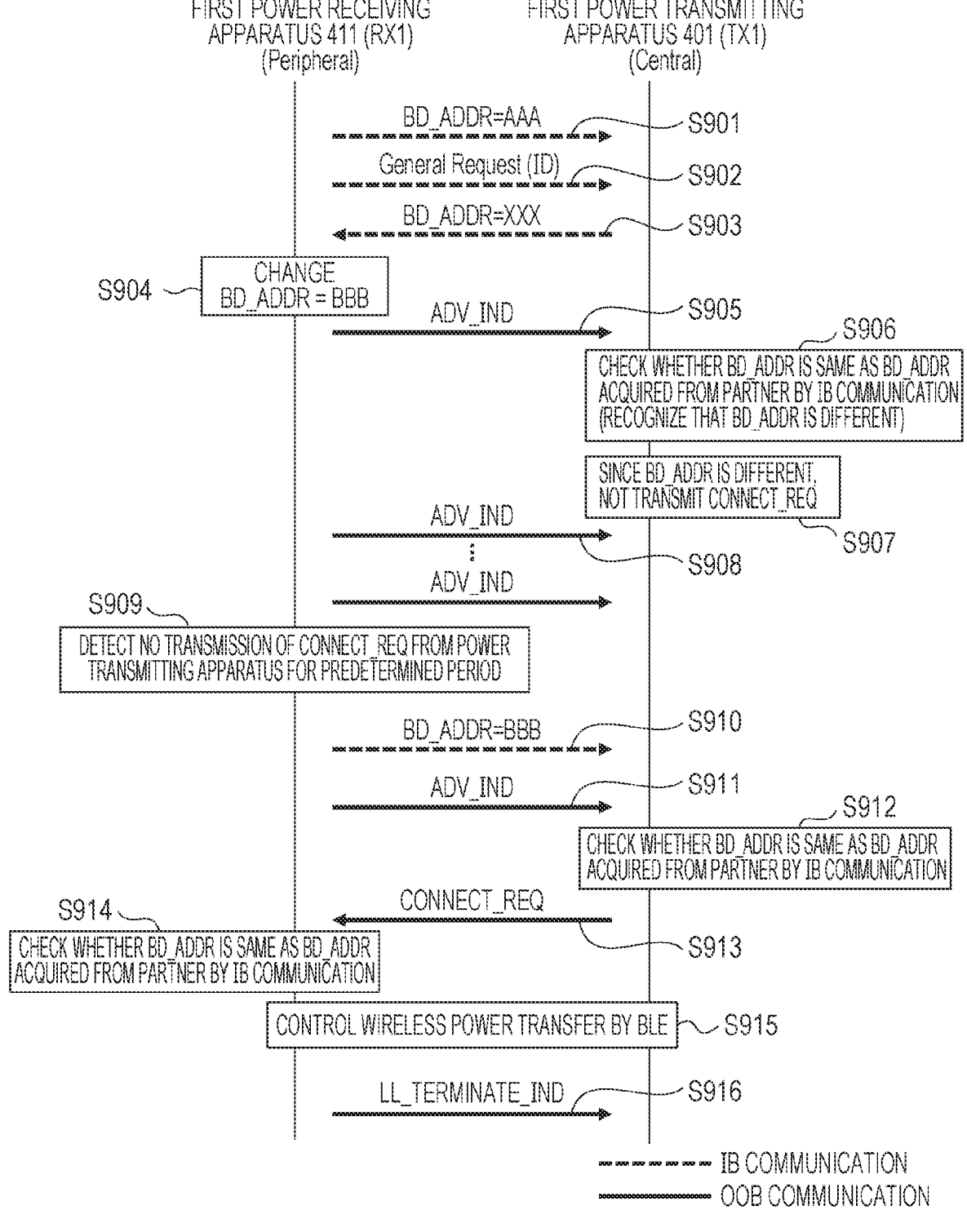
FIG. 9 is a sequence diagram illustrating a process example for performing wireless power transfer in a third embodiment.

An example of a flow of a process executed by a power transfer system described in this embodiment will be described with reference to FIG. 9. FIG. 9 is a sequence diagram illustrating operations for preventing a cross connection in the first power receiving apparatus 411 (RX1) and the first power transmitting apparatus 401 (TX1) illustrated in FIG. 4, which will be described in this embodiment. Note that in FIG. 9, dashed arrows indicate exchanges between RX1 and TX1 by IB communication. Solid arrows indicate exchanges between RX1 and TX1 by OOB communication. Note that the flow of the process executed by TX1 is mostly the same as that in FIG. 5 described in the first embodiment, and only different operations will be described. The flow of the process executed by RX1 is mostly the same as that in FIG. 6 described in the first embodiment, and only different operations will be described.

First, RX1 operating as a Peripheral in BLE communication notifies TX1 operating as a Central in BLE communication of the BD_ADDR of RX1 (S901). The BD_ADDR is transmitted by being included in an Identification Packet or Extended ID Packet by IB communication.

In this case, the BD_ADDR of RX1 is assumed to be AAA. As described above, the BD_ADDR is the individual identification information of the BLE communication function (the second communication unit 204). TX1 holds the BD_ADDR acquired in S901 in a memory. Subsequently, RX1 transmits a signal for inquiring about the BD_ADDR to TX1 (S902). This signal may be the above-described General Request (ID). Upon receiving the General Request (ID), TX1 transmits a response including the BD_ADDR of TX1 in BLE to RX1 (S903). In this case, the BD_ADDR of TX1 is assumed to be XXX. This response may be a Power Transmitter Identification Packet TX ID Packet as described above. RX1 holds XXX, which is the BD_ADDR of TX1, in a memory.

When the above-described process from S901 to S903 is completed so that TX1 and RX1 can notify the partner of each other's BD_ADDR and recognize the partner's BD_ADDR, the following is performed. That is, TX1 activates the BLE communication function of TX1 as a Scanner in order to attempt control communication with RX1 by BLE (not illustrated). On the other hand, RX1 starts broadcast transmission of an ADVERTISE_INDICATION (not illustrated).

As described above, by the process from S901 to S903, TX1 and RX1 can notify the partner of each other's BD_ADDR by IB communication and recognize the partner's BD_ADDR. IB communication is communication performed by superimposing a signal on an electromagnetic wave transmitted from the power transmitting antenna 105. Basically, only RX1 can communicate with TX1. Therefore, by the process from S901 to S903 by IB communication, TX1 can recognize the BD_ADDR of RX1, which is the power transmission target, and RX1 can recognize the BD_ADDR of TX1, which transmits power to RX1. When OOB communication is performed based on these BD_ADDRs, the above-described cross connection does not occur. However, some devices change the identification information (BD_ADDR) in BLE communication regularly or irregularly, for example, for privacy protection. If TX1 and RX1 recognize the partner's BD_ADDR in the above-described process from S901 to S903 and the BD_ADDR is changed before the connection by BLE communication is completed, it is not possible for TX1 and RX1 to be connected by BLE communication. A solution in this case is as follows.

In this embodiment, RX1 is assumed to change the BD_ADDR. RX1 changes the BD_ADDR (S904). In this case, RX1 is assumed to change the BD_ADDR from AAA to BBB.

Subsequently, RX1 transmits an ADV_IND including information of BBB, which is the new BD_ADDR, to TX1 (S905). Then, TX1 determines whether the information of the BD_ADDR of RX1 acquired in S902 corresponds to the information of the BD_ADDR acquired in S905, and recognizes no correspondence (S906). Then, since the information of the BD_ADDR of RX1 does not correspond as described above, TX1 does not transmit a CONNECT_REQ, which is a BLE communication connection request, to RX1 (S907).

RX1 continues to transmit the ADV_IND including the information of BBB, which is the new BD_ADDR, regularly (S908). In response to this, TX1 does not transmit a CON-NECT_REQ, which is a BLE communication connection request, to RX1 (not illustrated). RX1 continues to transmit the ADV_IND, but detects no transmission of a CONNEC-T_REQ from TX1 to RX1 even after a predetermined period has elapsed (S909). That is, in FIG. 6, if a CONNECT_REQ is not transmitted from TX1 for a predetermined period in S626, RX1 determines that there is a possibility that the BD_ADDR of RX1 is changed. Accordingly, RX1 detects a possibility that the BD_ADDR of RX1 is changed, and transmits the changed new BD_ADDR (BBB) to TX1 by IB communication (S910). The BD_ADDR is transmitted by being included in an Identification Packet or Extended ID Packet by IB communication. Then, RX1 continues to transmit the ADV_IND including the information of BBB, which is the new BD_ADDR, to TX1 (S911). Therefore, TX1 can compare the information of the BD_ADDR obtained in S910 with the information of the BD_ADDR obtained from the ADV_IND in S911, and recognize the correspondence (S912). As a result, TX1 recognizes RX1 as a power receiving apparatus that is a power transmission target, and transmits a CONNECT_REQ to RX1 in order to establish BLE communication with RX1 (S913). Since the operations from S914 to S916 are the same as those from S709 to S711 in the first embodiment, a description thereof is omitted.

In this embodiment, in response to the detection that a CONNECT_REQ is not transmitted from the power trans-mitting apparatus for a predetermined period (S909), TX1 is directly notified of the changed new BD_ADDR by IB communication. Accordingly, it is possible to establish a BLE connection with a power transfer target, while not establishing a BLE connection with another apparatus that is not a power transfer target. In addition, even if the BD_ADDR of RX1 is changed, it is possible to establish a BLE connection with the power transfer target.

Fourth Embodiment

In the third embodiment, a method is described in which, in response to the detection that a CONNECT_REQ is not transmitted from the power transmitting apparatus for a predetermined period (S909), TX1 is directly notified of the changed new BD_ADDR by IB communication. In this embodiment, a method will be described in which, if the BD_ADDR of the power receiving apparatus is changed and the power receiving apparatus detects no transmission of a CONNECT_REQ from the power transmitting apparatus for a predetermined period, control is performed so that a cross connection does not occur by a method different from that of the third embodiment.

An example of a flow of a process executed by a power transfer system described in this embodiment will be described with reference to FIG. 10. FIG. 10 is a sequence diagram illustrating operations for preventing a cross con-nection in the first power receiving apparatus 411 (RX1) and the first power transmitting apparatus 401 (TX1) illustrated in FIG. 4, which will be described in this embodiment. Note that in FIG. 10, dashed arrows indicate exchanges between RX1 and TX1 by IB communication. Solid arrows indicate exchanges between RX1 and TX1 by OOB communication. Note that the flow of the process executed by the power transmitting apparatus (TX1) is mostly the same as that in FIG. 5 described in the first embodiment, and only different operations will be described. The flow of the process executed by the power receiving apparatus (RX1) is mostly the same as that in FIG. 6 described in the first embodiment, and only different operations will be described.

Since the operations from S1001 to S1009 in FIG. 10 are the same as the operations from S901 to S909 described in the third embodiment, a description thereof is omitted. If RX1 detects that a CONNECT_REQ is not transmitted from the power transmitting apparatus for a predetermined period (S1009), RX1 transmits an End Power Transfer Packet to TX1 by IB communication (S1010). In particular, an End Power Transfer Packet including a value representing Restart Power Transfer is transmitted as an End Power Transfer Code.

That is, in FIG. 6, if a CONNECT_REQ is not transmitted from TX1 for a predetermined period in S614, RX1 deter-mines that there is a possibility that the BD_ADDR of RX1 is changed (S643). In addition, if RX1 determines that there is a possibility that the BD_ADDR of RX1 is changed, instead of S644 in FIG. 6, RX1 transmits the End Power Transfer Packet to TX1 by IB communication.

This can be implemented by a host CPU that controls the entirety of RX1 controlling (transmitting a command to) the communication control unit 301 that controls the first com-munication unit 203 so as to transmit the End Power Transfer Packet. Upon receiving the End Power Transfer Packet, TX1 stops power transmission in a case of perform-ing power transmission, detects the presence or absence of a foreign object, and transitions to the Ping phase. In addition, RX1 is reset simultaneously with the transmission of the End Power Transfer Packet and returns to the initial state. That is, TX1 transitions to S501 in FIG. 5, and RX1 transitions to S601 in FIG. 6. Since both TX1 and RX1 transition to the initial states of the flows in FIGS. 5 and 6, the process from S1001 to S1003 by IB communication is executed again (S1011 to S1013). At this time, RX1 notifies TX1 of the changed new BD_ADDR in S1011. Then, TX1 holds the acquired new BD_ADDR in the memory. Since the operations from S1014 to S1019 are the same as those from S911 to S916 in FIG. 9, a description thereof is omitted.

In this embodiment, in response to the detection that a CONNECT_REQ is not transmitted from TX1 for a prede-termined period (S1009), the End Power Transfer Packet is transmitted. Accordingly, it is possible to establish a BLE connection with a power transfer target, while not establish-ing a BLE connection with another apparatus that is not a power transfer target. In addition, even if the BD_ADDR of RX1 is changed, it is possible to establish a BLE connection with the power transfer target.

Fifth Embodiment

In the fourth embodiment, a method has been described in which control is performed such that RX1 transmits the End Power Transfer Packet to TX1, TX1 and RX1 are reset, and RX1 notifies TX1 of the changed new BD_ADDR. In this embodiment, a method will be described in which the power transmitting apparatus controls the power transmitting apparatus and the power receiving apparatus to be reset so that a cross connection does not occur.

Figure 11:
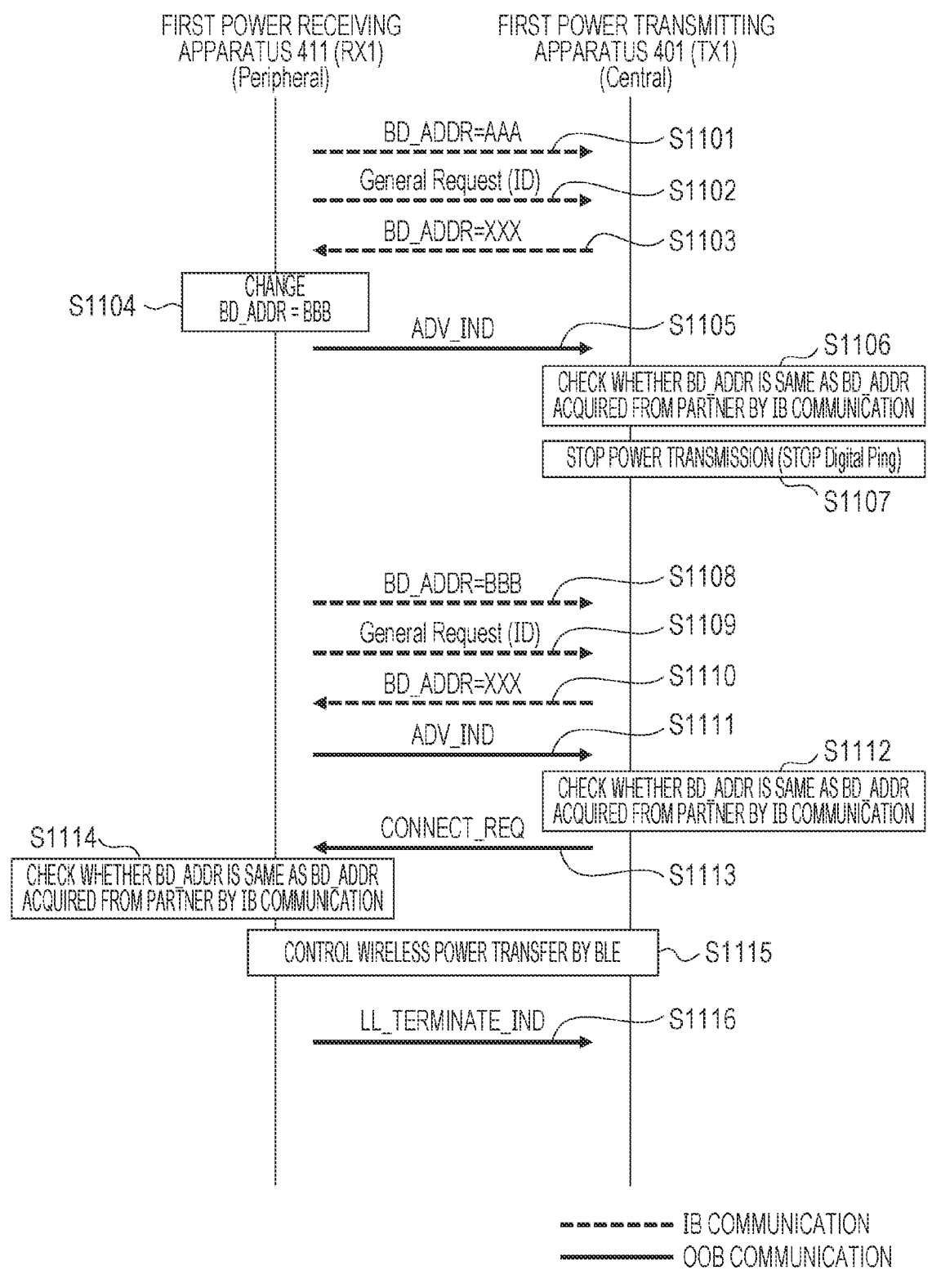
FIG. 11 is a sequence diagram illustrating a process example for performing wireless power transfer in a fifth embodiment.

An example of a flow of a process executed by a power transfer system described in this embodiment will be described with reference to FIG. 11. FIG. 11 is a sequence diagram illustrating operations for preventing a cross connection in the first power receiving apparatus 411 (RX1) and the first power transmitting apparatus 401 (TX1) illustrated in FIG. 4, which will be described in this embodiment. Note that in FIG. 11, dashed arrows indicate exchanges between RX1 and TX1 by IB communication. Solid arrows indicate exchanges between RX1 and TX1 by OOB communication. Note that the flow of the process executed by TX1 is mostly the same as that in FIG. 5 described in the first embodiment, and only different operations will be described. The flow of the process executed by the power receiving apparatus (RX1) is mostly the same as that in FIG. 6 described in the first embodiment, and only different operations will be described.

Since S1101 to S1106 in FIG. 11 are the same as S1001 to S1006 described in the fourth embodiment, a description thereof is omitted. In S1106, upon TX1 detecting that the BD_ADDR of RX1 obtained by IB communication does not correspond to the BD_ADDR of RX1 obtained from the ADV_IND by OOB communication, TX1 stops power transmission to RX1 (S1107). That is, in a case of YES in S541 in FIG. 5, TX1 performs control to stop power transmission to RX1.

In S1107, when TX1 stops power transmission to RX1, it is not possible for RX1 to operate the first communication unit 203, the second communication unit 204, the power receiving circuit unit 202, and the like. Therefore, RX1 is reset to be in the initial state, and returns to S601 in FIG. 6. In addition, in response to the stop of power transmission to RX1 in S1107, TX1 also resets the state of TX1 and returns to S501 in FIG. 5. When TX1 stops power transmission to RX1, both TX1 and RX1 can be reset. Since S1108 to S1116 are the same operations as S1011 to S1019 described in the fourth embodiment, a description thereof is omitted.

Accordingly, it is possible to establish a BLE connection with a power transfer target, while not establishing a BLE connection with another apparatus that is not a power transfer target. In addition, even if the BD_ADDR of RX1 is changed, it is possible to establish a BLE connection with the power transfer target.

Sixth Embodiment

In the fifth embodiment, upon TX1 detecting that the BD_ADDR of RX1 obtained by IB communication does not correspond to the BD_ADDR of RX1 obtained from the ADV_IND by OOB communication, TX1 stops power transmission to RX1. A method has been described in which TX1 and RX1 are thus reset, and RX1 transmits the changed new BD_ADDR to TX1 by IB communication, thereby establishing a BLE connection with the power transfer target.

In this embodiment, when the BD_ADDR of the power receiving apparatus is changed and the power transmitting apparatus detects the possibility that the BD_ADDR of the power receiving apparatus is changed, the power transmitting apparatus requests a re-notification of the BD_ADDR from the power receiving apparatus. Then, a method of performing control so that a cross connection does not occur by receiving the changed BD_ADDR by IB communication will be described.

Figure 12:
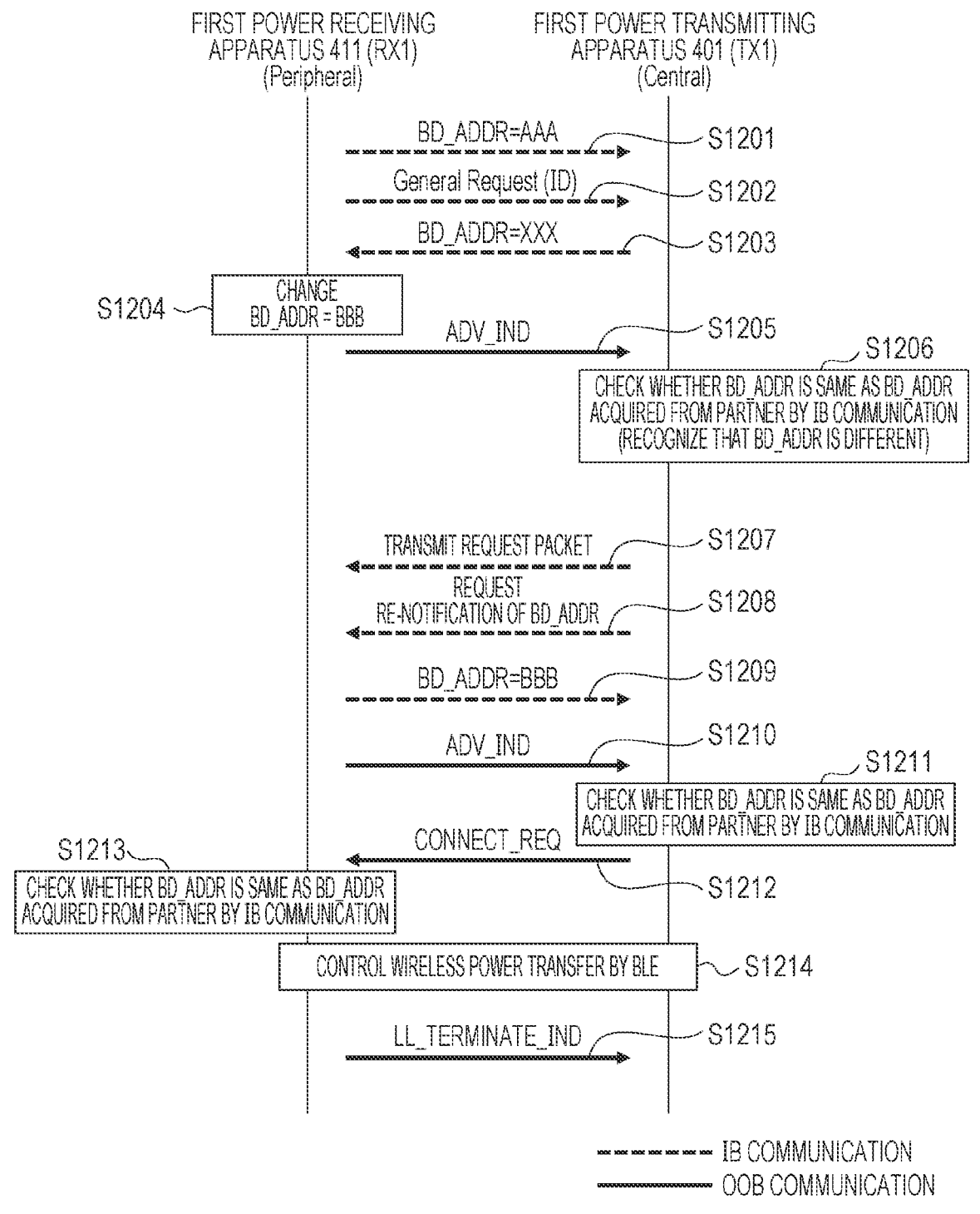
FIG. 12 is a sequence diagram illustrating a process example for performing wireless power transfer in a sixth embodiment.

An example of a flow of a process executed by a power transfer system described in this embodiment will be described with reference to FIG. 12. FIG. 12 is a sequence diagram illustrating operations for preventing a cross connection in the first power receiving apparatus 411 (RX1) and the first power transmitting apparatus 401 (TX1) illustrated in FIG. 4, which will be described in this embodiment. Note that in FIG. 12, dashed arrows indicate exchanges between RX1 and TX1 by IB communication. Solid arrows indicate exchanges between RX1 and TX1 by OOB communication. Note that the flow of the process executed by TX1 is mostly the same as that in FIG. 5 described in the first embodiment, and only different operations will be described. The flow of the process executed by RX1 is mostly the same as that in FIG. 6 described in the first embodiment, and only different operations will be described.

Since S1201 to S1206 are the same as S1101 to S1106 in the fifth embodiment, a description thereof is omitted. If the BD_ADDR of RX1 obtained by IB communication does not correspond to the BD_ADDR of RX1 obtained from the ADV_IND by OOB communication, TX1 requests a re-notification of the BD_ADDR by IB communication from RX1 (S1207 and S1208). In S1207, a request packet transmitted from TX1 to RX1 is a packet indicating that TX1 requests an operation from RX1. In addition, in S1208, a packet includes identification information for identifying the operation requested by TX1 from RX1. Note that the operations in S1206 and S1207 may be performed in one packet. That is, TX1 may transmit, to RX1, a packet indicating that TX1 requests an operation from RX1 and including identification information for identifying the requested operation.

That is, if it is detected the BD_ADDR of RX1 obtained by IB communication in S511 in FIG. 5 does not correspond to the BD_ADDR of RX1 obtained from the ADV_IND by OOB communication, RX1 determines that there is a possibility that the BD_ADDR of RX1 is changed. Then, in S542, TX1 transmits, to RX1, a packet for requesting a re-notification of the BD_ADDR (S1207 and S1208 described above). Then, upon TX1 being notified of the changed new BD_ADDR from RX1, the BD_ADDR is held in the memory (S543). Since the operations from S1209 to S1215 are the same as those from S705 to S711 in FIG. 7, a description thereof is omitted.

Accordingly, it is possible to establish a BLE connection with a power transfer target, while not establishing a BLE connection with another apparatus that is not a power transfer target. In addition, even if the BD_ADDR of RX1 is changed, it is possible to establish a BLE connection with the power transfer target.

OTHER EMBODIMENTS

In the first to sixth embodiments described above, a method has been described in which a BLE connection is established with a power transfer target, while a BLE connection is not established with another apparatus that is not a power transfer target. Hereinafter, configurations applicable to the first to sixth embodiments will be described.

If the BD_ADDR of RX1 is changed after BLE communication is established between TX1 and RX1, RX1 does not transmit the changed new BD_ADDR to TX1. This is because, after OOB communication (BLE communication) is established between TX1 and RX1, the BD_ADDR is not necessary for performing BLE communication. Accordingly, it is possible to suppress unnecessary communication.

In the first to sixth embodiments, a case has been described in which RX1 is a Peripheral, TX1 is a Central, and the BD_ADDR of RX1 is changed. However, RX1 may be a Central, TX1 may be a Peripheral, and the BD_ADDR of TX1 may be changed. A method of preventing the cross connection in this case will be described for each of the first to sixth embodiments. That is, a case where RX1 and TX1 in FIGS. 7 to 12 are interchanged will be described.

In the following description with reference to drawings, it is assumed that RX1 and TX1 in FIGS. 7 to 12 are interchanged. A case where RX1 is a Central, TX1 is a Peripheral, and the BD_ADDR of TX1 is changed in the first embodiment will be considered. If TX1 changes the BD_ADDR of TX1 (S704), TX1 transmits, to RX1, a request packet for requesting TX1 to transmit a General Request (ID). Upon receiving this, RX1 transmits the General Request (ID) to TX1. Upon receiving this, TX1 transmits the changed new BD_ADDR of TX1 to RX1 by IB communication. Accordingly, even if the BD_ADDR of TX1 is changed, it is possible to establish a BLE connection with the power transfer target.

In a case of the second embodiment, if TX1 changes the BD_ADDR (S804), RX1 transmits a request packet for requesting TX1 to transmit an EPT_Restart to RX1. Upon receiving this, RX1 transmits the EPT_Restart to TX1 (S805). Accordingly, even if the BD_ADDR of TX1 is changed, it is possible to establish a BLE connection with the power transfer target.

In a case of the third embodiment, if TX1 provides a notification of the new BD_ADDR (S910), TX1 transmits, to RX1, a request packet for requesting TX1 to transmit a General Request (ID). Upon receiving this, RX1 transmits the General Request (ID) to TX1. Upon receiving this, TX1 transmits the changed new BD_ADDR of TX1 to RX1 by IB communication. Accordingly, even if the BD_ADDR of TX1 is changed, it is possible to establish a BLE connection with the power transfer target.

In a case of the fourth embodiment, if TX1 detects no transmission of a CONNECT_REQ from RX1 in S1009, control needs to be performed so that RX1 transmits an EPT_Restart to TX1 in S1010. In order for RX1 to transmit the EPT_Restart to TX1, TX1 transmits a request packet for requesting an operation from RX1. Subsequently, RX1 transmits a packet including information for requesting TX1 to transmit the EPT_Restart. The requesting of the operation from RX1 (request packet) and the information for requesting transmission of the EPT_Restart may be transmitted by one packet. Accordingly, even if the BD_ADDR of TX1 is changed, it is possible to establish a BLE connection with the power transfer target.

In a case of the fifth embodiment, if TX1 changes the BD_ADDR in S1104, TX1 stops power transmission to RX1. Accordingly, even if the BD_ADDR of TX1 is changed, it is possible to establish a BLE connection with the power transfer target.

In a case of the sixth embodiment, RX1 does not transmit the request packet (S1207) and the BD_ADDR re-notification request (S1208), and instead, RX1 transmits a General Request (ID) to TX1. Then, TX1 transmits the changed new BD_ADDR to RX1 (S1209). Accordingly, even if the BD_ADDR of TX1 is changed, it is possible to establish a BLE connection with the power transfer target.

In the above-described cases, RX1 is a Central, TX1 is a Peripheral, and the BD_ADDR of TX1 is changed. The other cases are as follows.

A case where RX1 is a Peripheral, TX1 is a Central, and the BD_ADDR of TX1 is changed A case where RX1 is a Central, TX1 is a Peripheral, and the BD_ADDR of RX1 is changed Even in these cases, it is possible to establish a BLE connection with the power transfer target by the methods described in the first to sixth embodiments and the method described in this embodiment. That is, if TX1 changes the BD_ADDR, or if RX1 changes the BD_ADDR, the methods described in the first to sixth embodiments and the method described in this embodiment can be applied.

In addition, as another case, a case where the BD_ADDRs of both RX1 and TX1 are changed is also considered. Also in this cases, it is possible to establish a BLE connection with the power transfer target by TX1 or RX1 performing control by the methods described in the first to sixth embodiments and the method described in this embodiment.

In the first to sixth embodiments, RX1 notifies TX1 of the changed new BD_ADDR, thereby solving the problem. As a method different from this, if TX1 recognizes that RX1 has the function of changing the BD_ADDR, control communication between TX1 and RX1 may use IB communication, not OOB communication. In order to implement this, for example, RX1 having the function of changing the BD_ADDR, even if having an OOB communication function, notifies the power transmitting apparatus that RX1 does not have a communication means for OOB communication. This can be implemented in the process of exchanging the capabilities of TX1 and RX1 in the I & C phase or in the Negotiation phase, and can be transmitted, for example, by being included in the Configuration Packet described above.

Alternatively, if the BD_ADDR is changed at a stage where OOB communication is not established between TX1 and RX1, RX1 notifies the power transmitting apparatus that RX1 does not have a communication means for OOB communication at the time of determining to change the BD_ADDR. Alternatively, at the time of changing the BD_ADDR, even if having the OOB communication function, RX1 notifies the power transmitting apparatus that RX1 does not have a communication means for OOB communication. Accordingly, TX1 and RX1 perform control communication by IB communication, and it is possible not to establish a BLE connection with another apparatus that is not a power transfer target.

The present disclosure can also be implemented by processing in which a program for implementing one or more functions in the above-described embodiments is supplied to a system or an apparatus via a network or a storage medium, and one or more processors in a computer of the system or the apparatus read and execute the program. In addition, the present disclosure can also be implemented by a circuit (e.g., an ASIC or the like) that implements one or more functions. In addition, the program may be provided by being recorded in a computer-readable recording medium.

The power receiving apparatus of the present disclosure may be an information terminal device. For example, the information processing terminal includes a display unit (display) that displays information to a user and that is supplied with power received from a power receiving antenna. Note that the power received from the power receiving antenna is stored in a power storage unit (battery), and the power is supplied from the battery to the display unit. In this case, the power receiving apparatus may include a communication unit for communicating with another apparatus different from the power transmitting apparatus. The communication unit may also be compatible with a communication standard such as NFC communication or the fifth generation mobile communication system (5G).

The power receiving apparatus of the present disclosure may be a vehicle such as an automobile. For example, an automobile serving as the power receiving apparatus may receive power from a charger (power transmitting apparatus) via a power transmitting antenna installed in a parking lot. The automobile serving as the power receiving apparatus may also receive power from a charger (power transmitting apparatus) via a power transmitting antenna embedded in a road. In such an automobile, the received power is supplied to the battery. The power of the battery may be supplied to an actuation unit (a motor or an electric-powered unit) that drives the wheels, or may be used to drive a sensor used for driving assistance or to drive a communication unit that performs communication with an external apparatus. That is, in this case, the power receiving apparatus may include, in addition to the wheels, a battery, a motor and a sensor that are driven using the received power, and a communication unit that communicates with an apparatus other than the power transmitting apparatus. The power receiving apparatus may further include an accommodation unit for accommodating people. For example, the sensor may be a sensor used to measure an inter-vehicle distance or a distance to another obstacle. The communication unit may be compatible with, for example, a global positioning system (Global Positioning System, Global Positioning Satellite, GPS). The communication unit may also be compatible with a communication standard such as the fifth generation mobile communication system (5G). In addition, the vehicle may be a bicycle or a motorcycle.

The power receiving apparatus according to the present disclosure may be an electric tool, a home electric appliance, or the like. These devices serving as power receiving apparatuses may include, in addition to a battery, a motor that is driven by received power stored in the battery. In addition, these devices may include a notification means for notifying the remaining amount of the battery or the like. These devices may include a communication unit for communicating with another apparatus different from the power transmitting apparatus. The communication unit may be compatible with a communication standard such as NFC or the fifth generation mobile communication system (5G).

The power transmitting apparatus according to the present disclosure may be an in-vehicle charger that transmits power to a mobile information terminal device such as a smartphone or a tablet compatible with wireless power transfer in an automobile. Such an in-vehicle charger may be provided anywhere in the automobile. For example, the in-vehicle charger may be installed in a console of the automobile, or may be installed in an instrument panel (dashboard), between passenger seats, on the ceiling, or on a door. However, it is preferably installed in a place so as not to interfere with the driving. In addition, although an example in which the power transmitting apparatus is an in-vehicle charger has been described, such a charger is not limited to being disposed in a vehicle, and may be installed in a transport vehicle such as a train, an aircraft, or a ship. In this case, the charger may also be installed between passenger seats, on the ceiling, or on a door.

A vehicle such as an automobile including an in-vehicle charger may be the power transmitting apparatus. In this case, the power transmitting apparatus includes wheels and a battery, and supplies power to the power receiving apparatus via a power transmitting circuit unit or a power transmitting antenna using power from the battery.

According to the present disclosure, it is possible to appropriately perform communication for wireless power transfer even if identification information of an apparatus, which is used for communication, is changed.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power receiving apparatus comprising:
a power receiving unit configured to wirelessly receive power from a power transmitting apparatus; and
a communication unit configured to perform communication with the power transmitting apparatus,
wherein the communication unit transmits, to the power transmitting apparatus, a packet for requesting to stop a power transmission and to restart a power transmission, at a first frequency, and
wherein the communication unit performs communication at a second frequency after the packet is transmitted.

2. The power receiving apparatus according claim 1, wherein the communication unit transmits, at the first frequency, identification information for identifying the power receiving apparatus, which is used for communication at the second frequency.

3. The power receiving apparatus according claim 2, further comprising:
a changing unit configured to regularly or irregularly change the identification information for identifying the power receiving apparatus, which is used for communication at the second frequency.

4. The power receiving apparatus according claim 3, wherein, in a case where the identification information is changed before the communication unit establishes a connection with the power transmitting apparatus at the second frequency, the communication unit transmits the changed identification information.

5. The power receiving apparatus according claim 3, wherein, in a case where, after the identification information is transmitted, the identification information is changed before the communication unit establishes a connection with the power transmitting apparatus at the second frequency, the communication unit transmits the changed identification information.

6. The power receiving apparatus according claim 2, wherein,
in a case where, after the identification information is transmitted, the identification information is changed before the communication unit establishes a connection with the power transmitting apparatus at the second frequency, the communication unit transmits the packet and
the communication unit transmits the changed identification information after the packet is transmitted and after the power transmission is restarted.

7. A method for a power receiving apparatus, the method comprising:
transmitting, to a power transmitting apparatus which wirelessly performs a power transmission, a packet for requesting to stop the power transmission and to restart the power transmission, at a first frequency; and
communicating at a second frequency after the packet is transmitted.

8. A non-transitory computer-readable storage medium which stores a program for causing a computer to execute a method for a power receiving apparatus, the method comprising:

transmitting, to a power transmitting apparatus which wirelessly performs a power transmission, a packet for requesting to stop the power transmission and to restart the power transmission, at a first frequency; and communicating at a second frequency after the packet is transmitted.

\* \* \* \* \*